(12) United States Patent
Sethi et al.

(10) Patent No.: US 8,771,079 B1
(45) Date of Patent: *Jul. 8, 2014

(54) METHOD AND SYSTEM TO MATCH USERS OF A SOCIAL GAMING PLATFORM

(75) Inventors: Sudhanshu Pintu Sethi, Cupertino, CA (US); Matthew Adam Ocko, Palo Alto, CA (US)

(73) Assignee: Zynga Inc., San Francisco, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/077,690

(22) Filed: Mar. 31, 2011

(51) Int. Cl.
 *A63F 9/00* (2006.01)
 *A63F 13/00* (2014.01)
 *G06F 17/00* (2006.01)
 *G06F 19/00* (2011.01)

(52) U.S. Cl.
 USPC ............................................................ 463/42

(58) Field of Classification Search
 CPC .............. A63F 13/12; A63F 2300/558; A63F 2300/5566
 USPC ................................ 463/36, 39, 42
 See application file for complete search history.

(56) References Cited

U.S. PATENT DOCUMENTS

| | | | |
|---|---|---|---|
| 3,504,912 A | 4/1970 | Jenney | |
| 5,830,067 A | 11/1998 | Graves et al. | |
| 6,024,643 A | 2/2000 | Begis | |
| 6,042,477 A | 3/2000 | Addink | |
| 6,106,395 A | 8/2000 | Begis | |
| 6,306,038 B1 | 10/2001 | Graves et al. | |
| 6,678,673 B1 | 1/2004 | Eves et al. | |
| 6,793,580 B2 | 9/2004 | Sinclair et al. | |
| 7,240,093 B1 | 7/2007 | Danieli et al. | |
| 7,278,921 B1 | 10/2007 | Fujisawa et al. | |
| 7,281,215 B1 | 10/2007 | Canfield et al. | |
| 7,313,594 B2 | 12/2007 | Murakami et al. | |
| 7,386,798 B1 | 6/2008 | Heikes et al. | |
| 7,512,653 B2 | 3/2009 | Krishnasamy et al. | |
| 7,819,749 B1 * | 10/2010 | Fish et al. ........................ | 463/42 |
| 8,019,692 B2 | 9/2011 | Rosen | |
| 8,303,416 B1 | 11/2012 | Thakkar et al. | |

(Continued)

FOREIGN PATENT DOCUMENTS

WO WO-2013016687 A1 1/2013

OTHER PUBLICATIONS

Badgeunlock, "Foursquare Badge—Entourage," http://www.badgeunlock.com/2010/08/foursquare-badge-entourage-retired-sxsw-2009/, Created Aug. 9, 2010.*

(Continued)

*Primary Examiner* — Omkar Deodhar
*Assistant Examiner* — Reginald Renwick
(74) *Attorney, Agent, or Firm* — Schwegman Lundberg & Woessner, P.A.

(57) ABSTRACT

An introduction mechanic of a computer-implemented online game introduces a user of the online game to other players of the online game that are experiencing a common game objective. The introduction mechanic may determine another player to introduce to the user based on the other player not being directly associated, as reflected within relationship data, with the user. Also, if the user and the other player are opted into the introduction mechanic, the introduction mechanic may associate the user and the other player with the common game objective of the computer-implemented game, thereby allowing the user and the other player to interact to achieve the common game objective.

39 Claims, 11 Drawing Sheets

(56) References Cited

U.S. PATENT DOCUMENTS

| | | | |
|---|---|---|---|
| 8,342,967 | B2 | 1/2013 | Thakkar et al. |
| 8,348,765 | B1 | 1/2013 | Thakkar et al. |
| 2002/0142815 | A1 | 10/2002 | Candelore |
| 2002/0183105 | A1 | 12/2002 | Cannon et al. |
| 2003/0050115 | A1 | 3/2003 | Leon et al. |
| 2003/0195043 | A1 | 10/2003 | Shinners et al. |
| 2004/0097287 | A1* | 5/2004 | Bostrel .......................... 463/41 |
| 2004/0127289 | A1 | 7/2004 | Davis et al. |
| 2004/0132521 | A1 | 7/2004 | Peterson |
| 2006/0116198 | A1 | 6/2006 | Leen et al. |
| 2006/0121990 | A1 | 6/2006 | O'Kelley, II et al. |
| 2006/0135264 | A1 | 6/2006 | Shaw et al. |
| 2006/0247055 | A1 | 11/2006 | O'Kelley, II et al. |
| 2006/0270419 | A1* | 11/2006 | Crowley et al. ........... 455/456.2 |
| 2007/0060305 | A1 | 3/2007 | Amaitis et al. |
| 2007/0087799 | A1* | 4/2007 | Van Luchene ................. 463/1 |
| 2007/0117629 | A1 | 5/2007 | Fowler et al. |
| 2007/0173326 | A1 | 7/2007 | Jennings et al. |
| 2008/0004117 | A1* | 1/2008 | Stamper et al. ................ 463/42 |
| 2008/0146338 | A1* | 6/2008 | Bernard et al. ............... 463/42 |
| 2009/0075738 | A1* | 3/2009 | Pearce .......................... 463/42 |
| 2009/0149248 | A1 | 6/2009 | Busey et al. |
| 2009/0197681 | A1 | 8/2009 | Krishnamoorthy et al. |
| 2009/0264202 | A1 | 10/2009 | Chen et al. |
| 2009/0280909 | A1 | 11/2009 | McEniry |
| 2009/0281988 | A1 | 11/2009 | Yoo |
| 2009/0312096 | A1 | 12/2009 | Kane et al. |
| 2010/0009756 | A1 | 1/2010 | Birclart et al. |
| 2010/0160038 | A1 | 6/2010 | Youm et al. |
| 2010/0205546 | A1 | 8/2010 | Appelman et al. |
| 2010/0218128 | A1* | 8/2010 | Bonat et al. ................... 715/765 |
| 2011/0246907 | A1* | 10/2011 | Wang et al. ................... 715/751 |
| 2011/0269546 | A1 | 11/2011 | Gill et al. |
| 2011/0307807 | A1 | 12/2011 | Norby |
| 2012/0015744 | A1 | 1/2012 | Mooney et al. |
| 2012/0041907 | A1 | 2/2012 | Wang et al. |
| 2012/0142429 | A1 | 6/2012 | Muller |
| 2012/0252579 | A1 | 10/2012 | Sethi et al. |
| 2012/0302354 | A1 | 11/2012 | Thakkar et al. |
| 2012/0302355 | A1 | 11/2012 | Thakkar et al. |
| 2013/0165234 | A1 | 6/2013 | Hall et al. |

OTHER PUBLICATIONS

U.S. Appl. No. 13/735,786, filed Jan. 7, 2013, Online Asynchronous Game With Player-Matching Mechanic.

U.S. Appl. No. 13/929,215, filed Jun. 27, 2013, Dynamic Player Match-Making For Social Games.

U.S. Appl. No. 13/244,743, Restriction Requirement mailed May 24, 2012, 6 pgs.

"U.S. Appl. No. 13/114,900, Examiner interview Summary mailed Feb. 21, 2012", 3.

"U.S. Appl. No. 13/114,900, Examiner interview Summary mailed Aug. 16, 2012", 3 pgs.

"U.S. Appl. No. 13/114,900, Examiner Interview Summary mailed Sep. 17, 2012", 1 pgs.

"U.S. Appl. No. 13/114,900, Non Final Office Action mailed May 11, 2012", 20 pgs.

"U.S. Appl. No. 13/114,900, Response filed Apr. 20, 2012 to Non Final Office Action mailed Jan. 20, 2012", 17 pgs.

"U.S. Appl. No. 13/144,900, Non Final Office Action mailed Jan. 20, 2012", 20 pgs.

"U.S. Appl. No. 13/144,900, Notice of Allowance mailed Sep. 13, 2012", 12 pgs.

"U.S. Appl. No. 13/244,743, Examiner Interview Summary mailed. Nov. 9, 2012", 3 pgs.

"U.S. Appl. No. 13/244,743, Non Final Office Action mailed Aug. 16, 2012", 15 pgs.

"U.S. Appl. No. 13/244,743, Response filed Jun. 25, 2012 to Restriction Requirement mailed May 5, 2012", 9 pgs.

"U.S. Appl. No. 13/244,743, Response filed Nov. 16, 2012 to Non Final Office Action mailed Aug. 16, 2012", 10 pgs.

"U.S. Appl. No. 13/244,921, Examiner Interview Summary mailed Feb. 21, 2012", 3 pgs.

"U.S. Appl. No. 13/244,921, Final Office Action mailed May 11, 2012", 18 pgs.

"U.S. Appl. No. 13/244,921, Non Final Office Action mailed Jan. 24, 2012", 16 pgs.

"U.S. Appl. No. 13/244,921, Notice of Allowance mailed Aug. 30, 2012", 11 pgs.

"U.S. Appl. No. 13/244,921, Response filed Apr. 23, 2012 to Non Final Office Action mailed Jan. 24, 2012", 13 pgs.

"U.S. Appl. No. 13/244,923, Examiner Interview Summary mailed Feb. 21, 2012", 3 pgs.

"U.S. Appl. No. 13/244,923, Final Office Action mailed May 8, 2012", 14 pgs.

"U.S. Appl. No. 13/244,923, Non Final Office Action mailed Jan. 23, 2012", 17 pgs.

"U.S. Appl. No. 13/244,923, Notice of Allowance mailed Sep. 6, 2012", 11 pgs.

"U.S. Appl. No. 13/244,923, Response filed Apr. 23, 2012 to Non Final Office Action mailed Jan. 23, 2012", 12 pgs.

"Chess (game) Encyclopedia Brittanica", [Online]. Retrieved from the Internet:<http://www.brittanica.com/bps/media-view/97/0/1/0>, (Accessed Jan. 16, 2012), 35 pgs.

"Chess Notation", [Online]. Retrieved from the Internet: <http://www.indepthinfo.com>, (Accessed Jan. 16, 2012), 8 pgs.

"Chess Rules", [Online], Retrieved from the Internet: <http://www.learnchessrules.com>, (Accessed Jan. 16, 2012), 2 pgs.

"Elo rating system", [online] Wikipedia, May 18, 2011 [retrieved on May 23, 2011], Retrieved from the Internet: <URL: http://en.wikipedia.org/wiki/Elo_rating_system>, 14 pgs.

"FIDE Laws of Chess", [Online]. Retrieved from the Internet: <http://fide.com/FIDE/handbook/LawsofChess.pdf>, (Accessed Jan. 16, 2012), 2 pgs.

"International Application Serial No. PCT/US2012/048691, Search Report mailed Oct. 16, 2012", 2 pgs.

"International Application Serial No. PCT/US2012/048691, Written Opinion mailed Oct. 16 2012", 4 pgs.

"Pairing Theory and tsh", [online] Sep. 7, 2010 [retrieved on May 23, 2011]. Retrieved from the Internet: <URL: http://www.poslarchive.com/math/software/tsh/doc/pairing.html>, 9 pgs.

"Rules of Chess—Frequentiy Asked Questions", [Online]. Retrieved from the Internet <http://www.chessvariants.com>, (Accessed Jan. 16 2012), 46 pgs.

"Swiss-system tournament", [online]Wikipedia, May 13, 2011 [retrieved on May 23, 2011]. <URL: http://en.wikipedia.org/wiki/Swiss-system_tournament>, 9 pgs.

Schiller, Eric, "The Official Rules of Chess", Caordoza Publishing, [Online]. Retrieved from the Internet: <http://www.ericschiller.com/pdf/PfficalRulesofChessSampe.pdf>, (Accessed Jan. 16, 2012), 2 pgs.

"U.S. Appl. No. 13/244,743 , Response filed May 13, 2013 to Final Office Action mailed Mar. 13, 2013", 11 pgs.

"U.S. Appl. No. 13/244,743, Final Office Action mailed Mar. 13, 2013", 16 pgs.

"U.S. Appl. No. 13/244,743, Final Office Action mailed Jun. 19, 2013", 17 pgs.

"Guild vs. Guild", [Online] Retrieved From Internet: <http://wiki.guildwars.com/wiki/Guild_versus_Guild>, (Accessed May 21, 2013).

"Instance Limitations", [Online] Retrieved From Internet: <http://www.wowwiki.com/Instance_limitations>, (Accessed May 21, 2013), 1 pg.

"Raiding for Newbies", [Online] Retrieved From Internet: <http://www.wowwiki.com/Raiding_for_newbies>, (Accessed May 21, 2013), 4 pgs.

* cited by examiner

METHOD AND SYSTEM TO MATCH USERS OF A SOCIAL GAMING PLATFORM

TECHNICAL FIELD

The present disclosure relates to games and applications in general and in particular to computer-implemented online games, such as online role-playing games, playable by more than one person from more than one location.

BACKGROUND

In many computer games, there is a virtual world or some other imagined playing space where a player/user of the game controls one or more player characters (herein "character," "player character," or "PC"). A game engine accepts inputs from the player, determines player character actions, decides outcomes of events and presents the player with a game display illuminating what happened. In some games, there are multiple players, either online or within a single console, wherein each player controls one or more player characters.

Computer games may also include various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player needs to overcome to advance within the game. Moreover, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

Unfortunately, players of these computer games may only continue to enjoy these games for as long as they obtain gratification from overcoming obstacles and progressing to experience new features of the game. Thus, to keep players interested, some game developers expand a game periodically to add new obstacles or features for players to explore. Nonetheless, it is common for players to get stuck in a game as they progress toward more difficult in-game obstacles. Some players may persevere to defeat these difficult obstacles. However, many players find themselves playing a game less often as the obstacles they encounter become more difficult, and as they encounter new game experiences less often.

SUMMARY

Various disclosed embodiments provide a game networking system that implements an introduction mechanic to introduce a first user of a computer-implemented game to other users that are experiencing a common game objective. The system may determine a second user to introduce to the first user based on the second user not being directly associated, as reflected within relationship data, with the first user. Moreover, if both the first and second users being opted into the introduction mechanic, the system may associate the first user and the second user with the common game objective of the computer-implemented game, which may allow the first user and the second user to interact to achieve the common game objective. However, if the first user is not opted into the introduction mechanic, the system may send an opt-in request for the introduction mechanic to the first user before making a friend introduction.

In some embodiments, the system may determine the second user to introduce to the first user by ranking a plurality of users of the computer-implemented game. For example, the system may rank the plurality of users according to game level proximity to the first user, according to degree of separation from the first user as reflected within the relationship data, or a combination of these two ranking techniques. The system may determine the second user based on the ranking of the plurality of users. Moreover, if the first user has opted-in to geographic-proximity introductions, the system may rank a plurality of users that are associated with a first geographic location that is within a determinable distance from a second geographic location associated with the first user.

In some embodiments, the system may present a flash sale transaction to the first user in response to determining that the first user has encountered an obstacle of the computer-implemented game. For example, the system may determine that the first user may be able to overcome the obstacle by purchasing a virtual good, additional virtual currency, or additional energy, and may present the first user with a corresponding flash sale transaction. If the first user desires to meet other players to complete this flash sale transaction, the system may introduce the first user to at least a second user that may too be interested in completing the same flash sale transaction. Similarly, the system may introduce the second user to at least a third user, thus forming a cascading path of introductions. Moreover, the first user may be introduced to a group of users that has been formed to complete the flash sale transaction. Furthermore, this group of users may too be introduced to another group of users to form a super group of users that have been introduced to each other. In some embodiments, the system may complete the flash sale transaction for a user (e.g., a user within a group, or within a cascading path) when the user has referred the flash sale transaction to a determinable minimum number of users (e.g., other players that this user has personally referred, or has been introduced to) that have purchased an item prior to an expiration deadline of the flash sale transaction. In some embodiments, the system may complete the flash sale transaction when a determinable minimum number of total users purchase the item prior to the expiration deadline of the flash sale transaction.

DESCRIPTION OF EXAMPLE EMBODIMENTS

Overview

Various embodiments provide an introduction mechanic that may introduce a user of a computer-implemented online game to other players of the online game that are encountering a common in-game obstacle. This introduction mechanic can help a user overcome a difficult obstacle, and thus allow the user to encounter and enjoy other features of the online game, by allowing the user to collaborate with other players that also desire to surpass this difficult obstacle. Moreover, enabling a user to meet and collaborate with other players has the added benefit of making the online game more enjoyable for the user.

System

Figure 1:
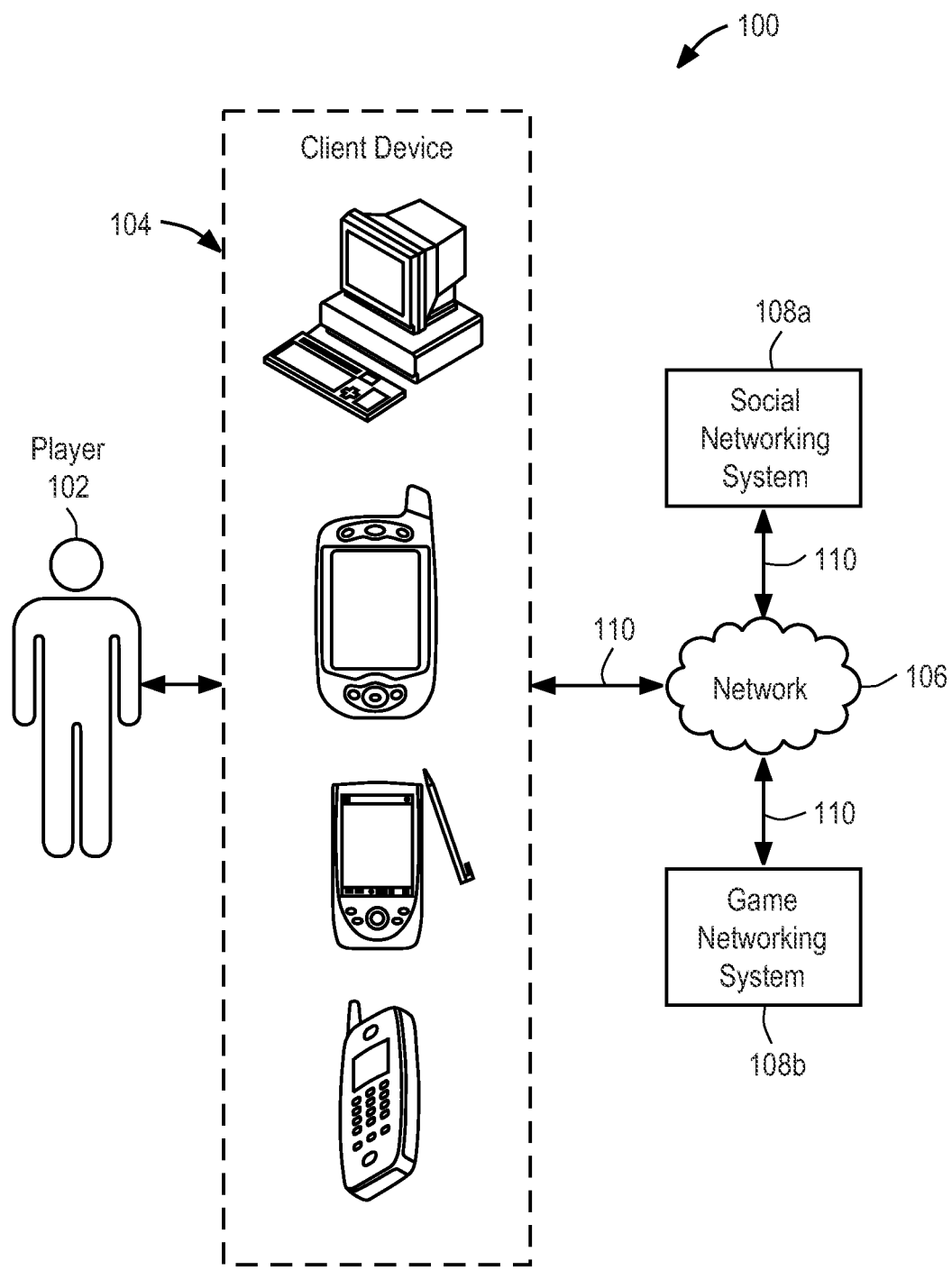
FIG. 1 illustrates an example of a system for implementing various disclosed embodiments.

FIG. 1 illustrates an example of a system 100 for implementing various disclosed embodiments. In some embodiments, system 100 comprises a player 102, a client device 104, a network 106, a social networking system 108a, and a game networking system 108b. The components of system 100 may be connected directly or over a network 106, which may be any suitable network. In various embodiments, one or more portions of network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Client device 104 may be any suitable computing device, such as a personal computer, laptop, cellular phone, smart phone, computing tablet, etc. Client device 104 may access social networking system 108a or game networking system 108b directly, via network 106, or via a third-party system. For example, client device 104 may access game networking system 108b via social networking system 108a.

Social networking system 108a may include a network-addressable computing system that can host one or more social graphs, and may be accessed by the other components of system 100 either directly or via network 106. Social networking system 108a may generate, store, receive, and transmit social networking data. Moreover, game networking system 108b may include a network-addressable computing system that can host one or more online games. Game networking system 108b may generate, store, receive, and transmit game-related data, such as, for example, game account data, game input, game state data, and game displays. Game networking system 108b may be accessed by the other components of system 100 either directly or via network 106. Player 102 may use client device 104 to access, send data to, and receive data from social networking system 108a and game networking system 108b. In various embodiments, game networking system 108b may include an introduction mechanic that can introduce a user of game networking system 108b to other players of game networking system 108b that are encountering a common in-game obstacle.

Although FIG. 1 illustrates a particular arrangement of player 102, client device 104, social networking system 108a, game networking system 108b, and network 106, this disclosure contemplates any suitable arrangement of player 102, client device 104, social networking system 108a, game networking system 108b, and network 106.

Figure 2:
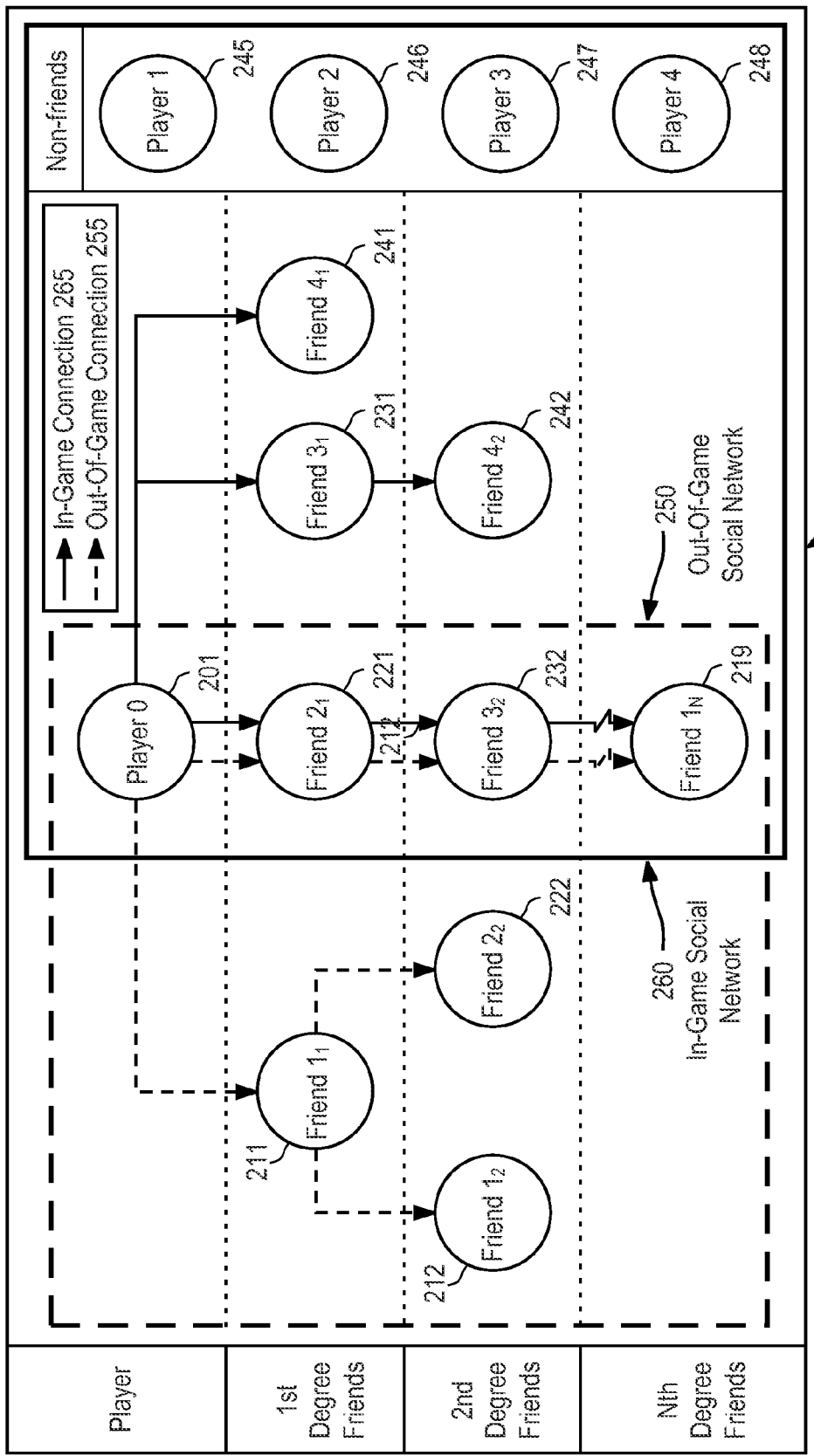
FIG. 2 shows an example of a social network within a social graph.

FIG. 2 shows an example of a social network within a social graph 200. Social graph 200 includes an out-of-game social network 250, and an in-game social network 260. Moreover, in-game social network 260 may include one or more players that are friends with Player 201 (e.g., Friend 231), and may include one or more other players that are not friends with Player 201 (e.g., Player 245).

As shown, Player 201 can be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of out-of-game social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In social graph 200, it is possible for individuals to be connected to other individuals through their first-degree friends friends of friends). As described above, the number of edges in a path that connects a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 108a.

In various embodiments, Player 201 can have Nth-degree friends connected to him through a chain of intermediary degree friends as indicated in FIG. 2. For example, Nth-degree Friend $1_N$ 219 is connected to Player 201 within in-game social network 260 via second-degree Friend $3_2$ 232 and one or more other higher-degree friends. Also, there may be players that are not Nth-degrees friends with Player 201 when a chain of intermediary friends does not exist within in-game social network 260. For example, Players 245-248 are not friends with Player 201, as they are not connected to Player 201 in in-game social network 260.

In particular embodiments, a player (or player character) may have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250. In particular embodiments, a game engine can access in-game social network 260, out-of-game social network 250, or both.

In particular embodiments, the connections in a player's in-game social network can be formed both explicitly (e.g., when users "friend" each other) and implicitly (e.g., when the system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Introduction Mechanic

In various embodiments, a computer-implemented online game can include a series of game-initiated or user-initiated in-game actions that comprise an introduction mechanic. For example, if a player has not achieved a particular objective of the online game after an extended period of time, it may be possible that introducing this player to other players at a similar game state can help this player achieve this objective, and thus help this player advance in the game. In particular embodiments, the introduction mechanic can introduce a user of the online game to other players that are experiencing a common game objective.

Figure 3A:
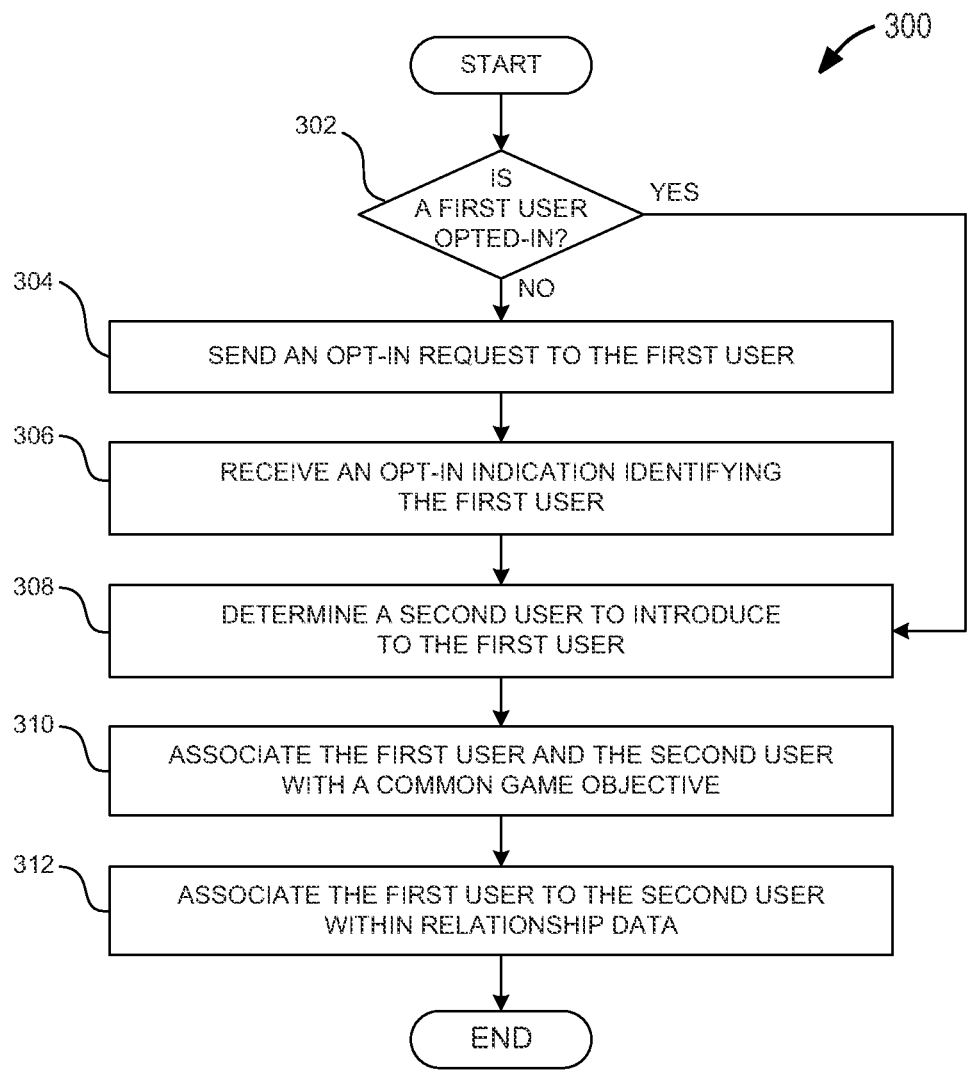
FIG. 3A shows a flowchart illustrating an example method to introduce a user to other players of a computer-implemented online game.

FIG. 3A shows a flowchart illustrating an example method 300 to introduce a user to other players of a computer-implemented online game. In particular embodiments, method 300 may be performed using social networking system 108a and/or game networking system 108b. The system may first determine whether the user is opted into the introduction mechanic at operation 302 before determining a player to introduce to the user at operation 308. If the system determines at operation 302 that the user is not opted into the introduction mechanic, the system sends an opt-in request to the user at operation 304, and waits to receive an opt-in indication identifying the user at operation 306 before determining the other player to introduce to the user.

In various embodiments, the opt-in request includes at least an option for the user to opt-in to the introduction mechanic, and the opt-in indication indicates that the user is opting-in to the introduction mechanic. Moreover, opting the user into the introduction mechanic may involve recording the user as opted into the introduction mechanic based on the opt-in indication.

In various embodiments, the system may send an opt-in request to the user in response to detecting one or more conditions. For example, the system may send the opt-in request to the user in response to determining that the user has not achieved a particular game objective. Moreover, the system may send the opt-in request to the user in response to detecting a decrease in game interactions from the user.

If the system determines at operation 302 that the user is opted into the introduction mechanic, the system continues to operation 308 to determine the other player to introduce to the user. In particular embodiments, the system determines the other player based on the other player not being directly associated with the user (i.e., not being a first-degree friend to the user), as reflected within relationship data of an online social network, and based on the user and the other player being opted into the introduction mechanic. In various embodiments, the online social network can include a social network of the online game, or can include a third-party social network in which players of the online game are enrolled.

In various embodiments, during operation 308, the system may rank a plurality of players of the online game according to degree of separation from the user, as reflected with the relationship data. Moreover, the system may determine the other player to introduce to the user based on the ranking of the plurality of players. Once the system determines the other player at operation 308, the system associates the user and the other player with a common game objective at operation 310, thereby allowing the user and the other player to interact to achieve the common game objective.

The common game objective may include any objective or milestone associated with making progress within the online game. For example, the common game objective may be a new game challenge which the user has not initiated, a current game challenge which the user has not completed, a game level which the user has not reached, or a virtual good which the user has not obtained. Moreover, the common game objective may include a competitive challenge of the online game, such that interactions between the user and the other player may include the user and the other player competing to achieve the common game objective. If the cooperative challenge includes a reward to a winning participant in the competitive challenge (e.g., the user), the system may award, to a losing participant in the competitive challenge (e.g., the other player), a diminished reward relative to a reward awarded to the winning participant.

The common game objective may also include a cooperative challenge of the online game, such that interactions between the user and the other player may include the user and the other player cooperating to achieve the common game objective. Moreover, the cooperative challenge may be a timed challenge, where the user and the other player participate in a synchronous interaction.

In various embodiments, the opt-in request may also include a variety of opt-in options for the user, and the opt-in indication may indicate which of these opt-in options were selected by the user. For example, the opt-in request may include an option for the user to opt-in to geographic-proximity introductions by the introduction mechanic, and the opt-in indication may indicate that the user is opting-in (or not opting-in) to geographic-proximity introductions. Therefore, if the system determines that the opt-in indication indicates that the user has opted into the geographic-proximity introductions, the system may identify, during operation 308, a set of players of the online game whose geographic location is within a determinable distance from the user's geographic location.

The opt-in request may also include a level-based ranking option which causes the introduction mechanic to identify other players whose game level is in proximity to the user. Thus, during operation 308, the introduction mechanic may rank a plurality of players of the online game according to game level proximity to the user, and may determine the other player to introduce to the user based on the ranking of the plurality of players. Moreover, the opt-in request may also include an option which causes the introduction mechanic to identify other players whose game level is within a determinable proximity to the user. For example, the level-based ranking option may provide the user with an option to receive introduction requests with players that are at most three game levels apart from the user.

In particular embodiments, the system may also associate the user to the other player within the relationship data of the social network (at operation 312). In doing so, the system may send an introduction request to the user that identifies the other player, and may also send an introduction request to the other player that identifies the user. Then, the system may associate the user and the other player in the relationship data based on receiving introduction confirmations from the user and the other player. In various embodiments, the introduction request identifies the common game objective associated with the user and the other player. Moreover, the introduction request may also include an incentive for the user, and may award the incentive to the user in response to receiving the introduction confirmations from the user and the other player.

In particular embodiments, the system may determine other players to introduce to the user, regardless of whether the user or the other players are opted in to the introduction mechanic. For example, the system may determine two or more players that have not achieved a common game objective, and that have decreased their interactions with the online game. Therefore, the system may first determine that these players can benefit from a mutual introduction, and then may send an opt-in request to any of these players that the system determines are not opted into the introduction mechanic.

Figure 3B:
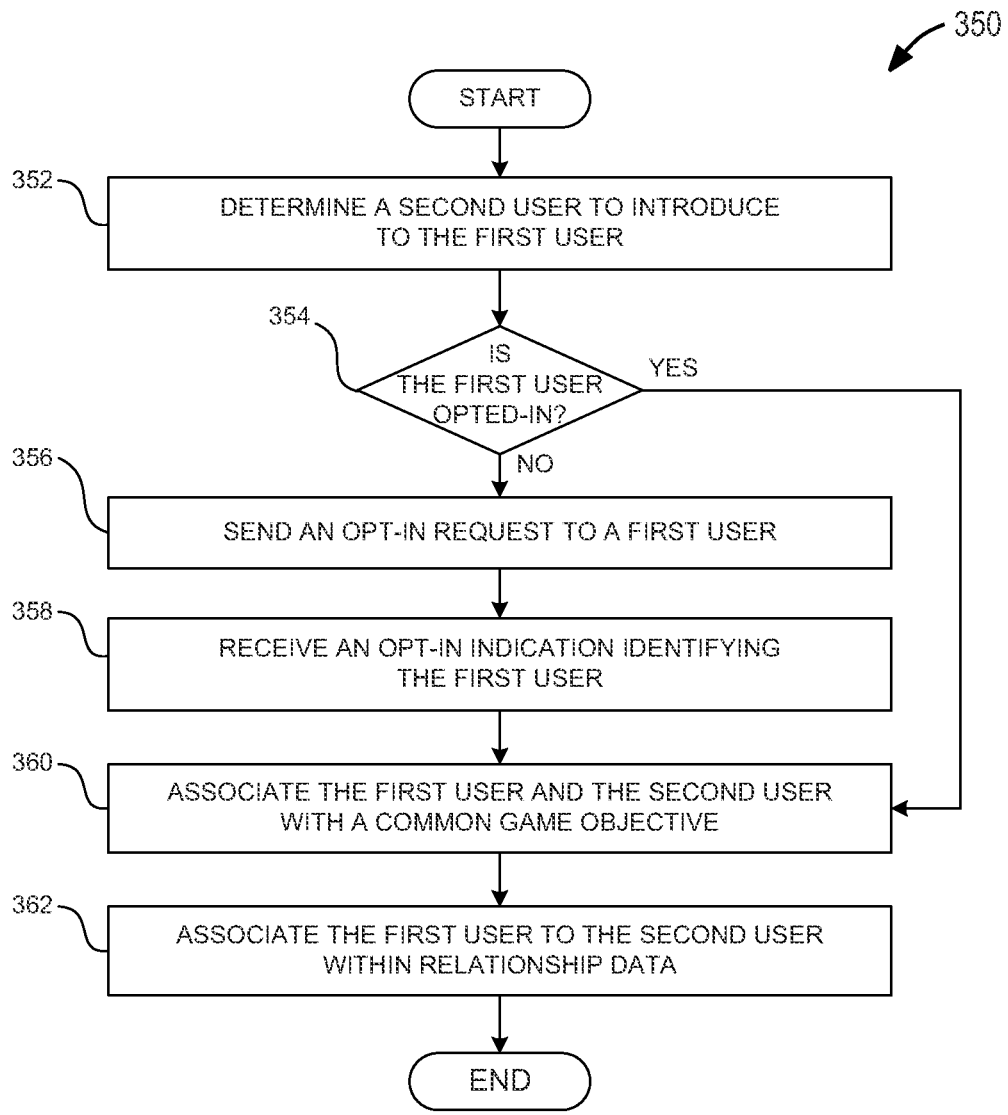
FIG. 3B shows a flowchart illustrating an example method to introduce a user to other players of a computer-implemented online game.

FIG. 3B shows a flowchart illustrating an example method 350 to introduce a user to other players of a computer-implemented online game. In particular embodiments, method 350 may be performed using social networking system 108*a* and/or game networking system 108*b*. The system may first determine a player to introduce to the user at operation 352 before determining whether the user is opted into the introduction mechanic at operation 354.

In particular embodiments, the system determines the other player based on the other player not being directly associated with the user (i.e., not being a first-degree friend to the user), as reflected within relationship data of an online social network. Moreover, during operation 352, the system may rank a plurality of players of the online game according to one or more metrics (e.g., a degree of separation from the user, as reflected with the relationship data), and may determine the other player based on the ranking of the plurality of players. Then, if the system determines at operation 354 that the user is opted into the introduction mechanic, the system continues to operation 360. At operation 360, the system associates the user and the other player with a common game objective, thereby allowing the user and the other player to interact to achieve the common game objective.

However, if the system determines at operation 354 that the user is not opted into the introduction mechanic, the system sends an opt-in request to the user at operation 356, and waits to receive an opt-in indication identifying the user at operation 358 before associating the user and the other player with a common game objective at operation 360. In various embodiments, the opt-in request includes at least an option for the user to opt-in to the introduction mechanic, and the opt-in indication indicates that the user is opting-in to the introduction mechanic. Moreover, opting the user into the introduction mechanic may involve recording the user as opted into the introduction mechanism based on the opt-in indication.

In particular embodiments, the system may also associate the user to the other player within the relationship data of the social network (at operation 362). In doing so, the system may send an introduction request to the user that identifies the other player, and may send an introduction request to the other player that identifies the user. Then, the system may associate the user and the other player in the relationship data based on receiving introduction confirmations from the user and the other player. In various embodiments, the introduction request identifies the common game objective associated with the user and the other player. Moreover, the introduction request may include an incentive for the user, and may award the incentive to the user in response to receiving the introduction confirmations from the user and the other player.

Handling Friend Referrals to the Introduction Mechanic

Figure 4:
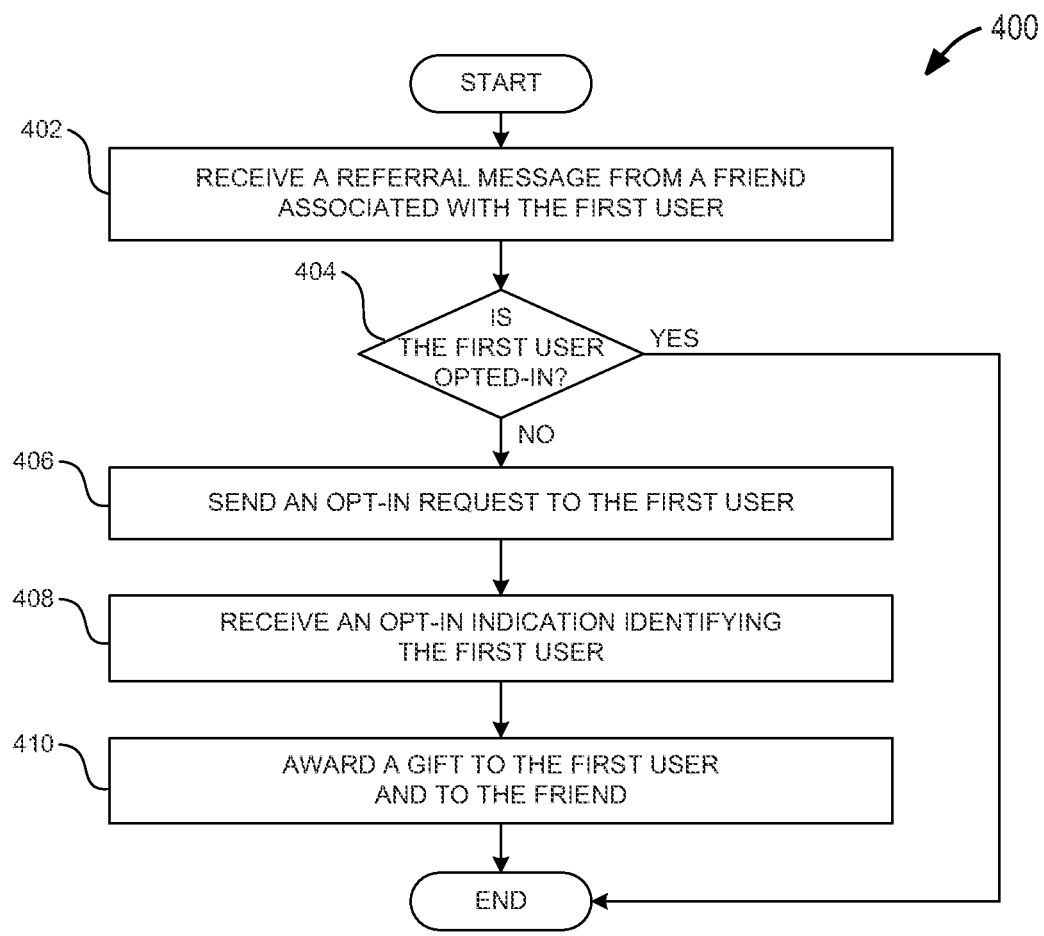
FIG. 4 shows a flowchart illustrating an example method to process a referral to an introduction mechanic of the computer-implemented online game.

FIG. 4 shows a flowchart illustrating an example method 400 to process a referral to an introduction mechanic of the computer-implemented online game. In particular embodiments, method 400 may be performed using social networking system 108*a* and/or game networking system 108*b*. The system may begin by receiving a referral message from a friend associated with the first user at operation 402. The referral message may indicate at least that the user's friend is referring the user to opt-in to the introduction mechanic. Then, in response to receiving the referral message, the system determines at operation 404 whether the user is opted into the introduction mechanic.

If the system determines that the user is not yet opted into the introduction mechanic, the system continues to operation 406 to send an opt-in request to the user, which may include an incentive for the user. Then, when the system receives an opt-in indication identifying the user at operation 408, the system continues to operation 410 to award a gift to the user and to the user's friend. However, if the system determines at operation 404 that the user is already opted-in, the system may not award a gift to the user and the user's friend because the user did not need the referral.

In particular embodiments, the system may award the incentive at operation 410 if the user opts-in to the introduction mechanic within the same game session that the user received the opt-in request. In other embodiments, the system may award the incentive regardless of whether the user opted into the introduction mechanic within the same game session that the user received the opt-in request, or a later game session.

Flash Sale Transactions

In particular embodiments, the online game may provide players of the computer-implemented game with an option to participate in a flash sale transaction. The flash sale transaction is complete when a determinable minimum number of players purchase an item prior to an expiration deadline of the flash sale transaction. In various embodiments, the system may present the flash sale transaction to a player in response to determining that the player has encountered an obstacle in the online game. For example, the system may determine that the player does not have enough energy to complete an objective of the online game, and may offer an energy pack to the player at a discounted rate though a flash sale transaction. Thus, some players may benefit from being introduced to other players of the online game so that they may refer more players to a particular flash sale transaction of interest.

In various embodiments, the system may send an introduction request to a particular user if the system determines that the flash sale transaction is about to expire and that the user has not referred enough players to the flash sale transaction. The system may identify other players that are likely to be interested in the flash sale transaction based on their user profile, and may introduce the user to these other players if the user opts-in to the introduction mechanic and accepts the introduction request.

Figure 5:
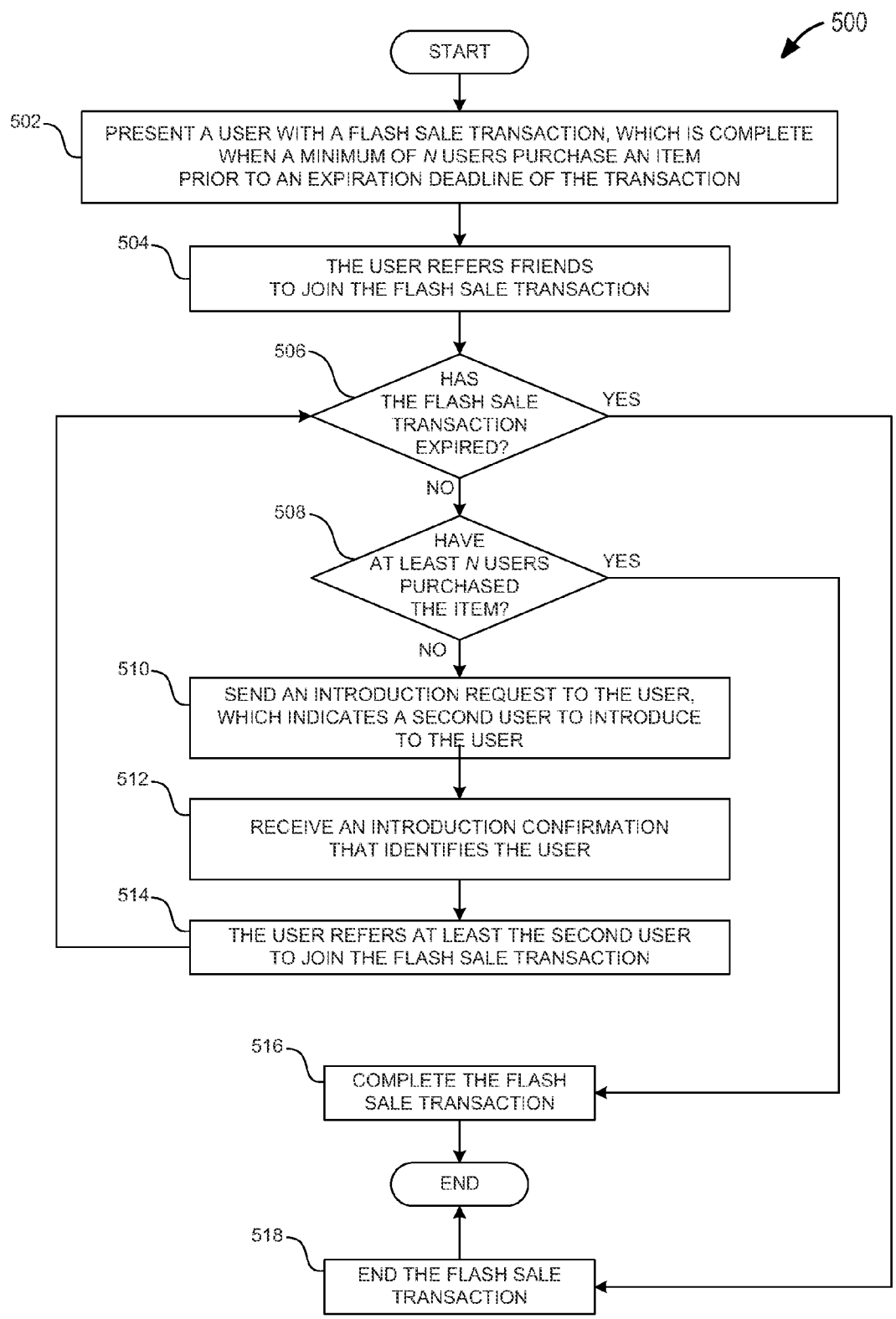
FIG. 5 shows a flowchart illustrating an example method to introduce a player to other players during a flash sale transaction within the computer-implemented online game.

FIG. 5 shows a flowchart illustrating an example method 500 to introduce a user to other players during a flash sale transaction within the computer-implemented online game. In particular embodiments, method 500 may be performed using social networking system 108a and/or game networking system 108b. The system may begin at operation 502 by presenting the user with a flash sale transaction, such that the flash sale transaction is complete when a minimum of N players purchase an item of the flash sale transaction prior to an expiration deadline of the transaction. Then, if the user decides to join the flash sale transaction, the user refers friends to participate in the flash sale transaction at operation 504.

In particular embodiments, the system may keep track of the time remaining before the flash sale transaction expires, and the number of players that are currently participating in the flash sale transaction. For example, at operation 506, the system determines whether the flash sale transaction has expired. If the flash sale transaction has expired, the system continues to operation 518 to end the flash sale transaction.

Otherwise, if the flash sale transaction has not expired, the system may continue to operation 508 to determine whether at least N players have opted to purchase the flash sale transaction item. If the system determines at operation 508 that enough players have opted to purchase the item, the system may continue to operation 516 to complete the flash sale transaction. Otherwise, the system may continue to operation 510 to send an introduction request to the user, such that the introduction request indicates another player to introduce to the user.

During operation 510, the system may determine that the user is not currently opted into the introduction mechanic, and may send an opt-in request to the user so that the user may meet other players of the online game to refer to the flash sale transaction. The system may then receive an opt-in indication from the user, which indicates that the user desires to meet other players to complete the flash sale transaction. Then, once the system determines that the user is opted into the introduction mechanic, the system may determine the other player to introduce to the user, and may send an introduction request to the user and to the other player.

At operation 512, the system receives an introduction confirmation from the user and the other player, at which point the system allows the user and the other player to interact. For example, the user may communicate with the other player, and the other player may join the flash sale transaction. Then at operation 514, the user may refer at least the other player to join the flash sale transaction, and the system returns to operation 506 to determine whether the flash sale transaction has expired. In various embodiments, the system may iterate through operations 510-514 several times until either the flash sale transaction is complete, or the flash sale transaction has expired. For example, the user may wish to continue receiving introduction requests until the user has referred a determinable minimum number of players to complete the flash sale transaction. In another example, the system may wait a determinable period of time between iterations (e.g., the system may wait a delay period before proceeding to send a subsequent introduction request to the user at operation 510), thereby allowing the user sufficient time to persuade other players to join the flash sale transaction.

In some embodiments, the system may introduce a first user to at least a second user, and may introduce the second user to at least a third user, thus forming a cascading path of introductions. Moreover, the first user may be introduced to a group of users that has been formed to complete the flash sale transaction. Furthermore, this group of users may too be introduced to another group of users to form a super group of users that have been introduced to each other.

In some embodiments, the system may complete the flash sale transaction for a user (e.g., a user within a group, or within a cascading path) when the user has referred the flash sale transaction to a determinable minimum number of other users (e.g., other players that this user has personally referred, or has been introduced to) that have purchased an item prior to an expiration deadline of the flash sale transaction, some embodiments, the system may complete the flash sale transaction when a determinable minimum number of total users purchase the item prior to the expiration deadline of the flash sale transaction.

Usage Analytics

In particular embodiments, the system may gather usage analytics to determine which features of the introduction mechanic are favored by players of the online game, and may use these usage analytics to determine which options to include in an opt-in request for a user of the introduction mechanic.

Figure 6:
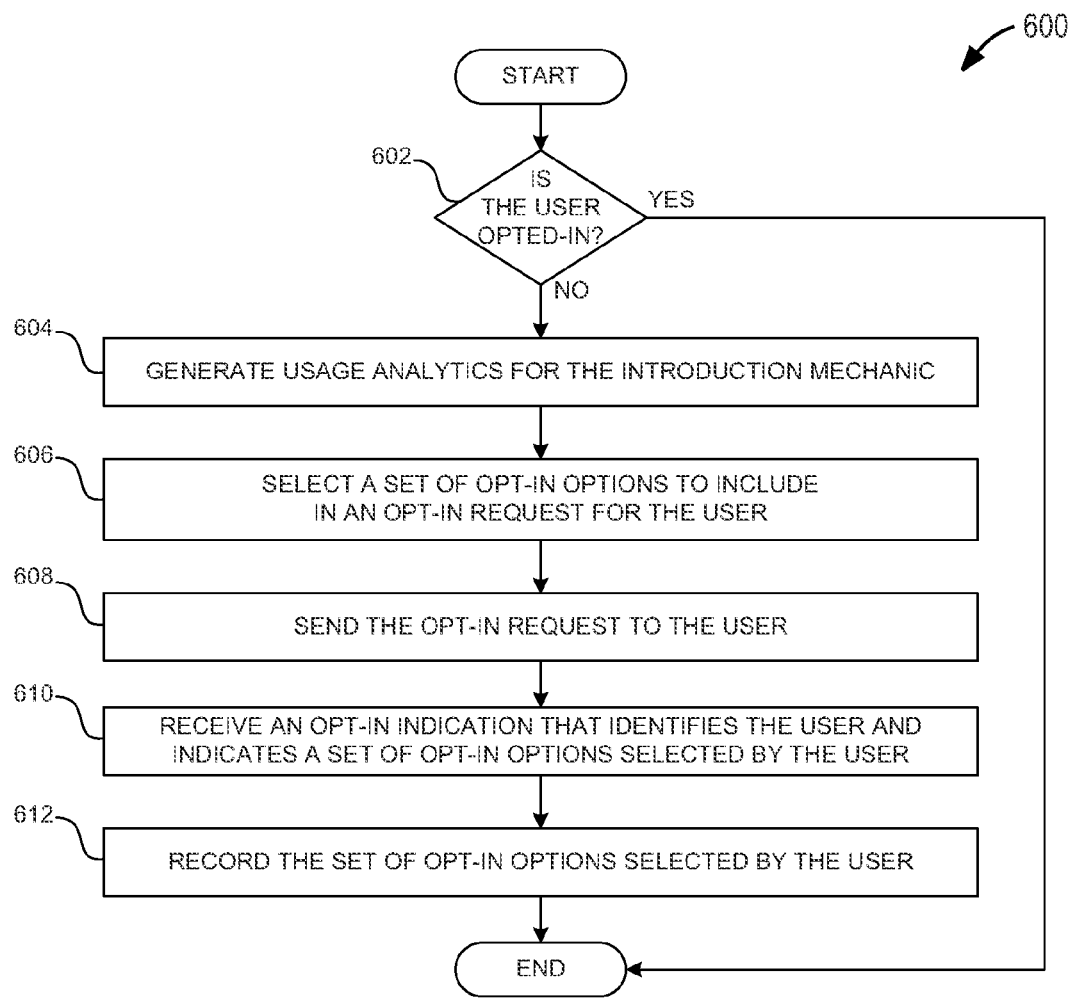
FIG. 6 shows a flowchart illustrating an example method to determine usage analytics associated with the introduction mechanic of the computer-implemented online game.

FIG. 6 shows a flowchart illustrating an example method 600 to determine usage analytics associated with the introduction mechanic of the computer-implemented online game. In particular embodiments, method 600 may be performed using social networking system 108a and/or game networking system 108b. Moreover, operations 602-612 may extend operations 302-306 of FIG. 3A, and/or may extend operations 354-358 of FIG. 3B.

The system may begin when determining whether a user of the online game is opted into the introduction mechanic at operation 602. If the system determines that the user is already opted-in, the system may not generate usage analytics for the introduction mechanic. However, if the system determines at operation 602 that the user is not opted into the introduction mechanic, the system may continue to operation 604 to generate usage analytics for the introduction mechanic.

In various embodiments, operation 604 may involve accessing historical data pertaining to a set of available opt-in options for the introduction mechanic, and generating usage analytics for the introduction mechanic that are tailored to the user. For example, the historical data may include a set of available options associated with an opt-in request to the introduction mechanic, and may include statistical data pertaining to the usage of these options. In particular embodiments, the statistical data may include: a tally for the number of users that are currently opted into a particular option, a tally for the number of users that have ever opted into a particular option, an average time period to which users remain opted into a particular option, etc. Moreover, the statistical data may also be broken down by category, including: a user demographic; a user geographic location; an online game attribute (e.g., a game's name); an online game state (e.g., a game state for a user); etc. The historical data may also include a record for the opt-in options selected (or not selected) by individual players of the online game over a period of time, along with a time stamp and contextual data pertaining to each record entry.

In various embodiments, during operation 604, the system may generate usage analytics that are tailored to a particular user by accessing statistical data that is relevant to the user based on the user's demographic information, geographic information, an attribute of the online game being played by the user, and/or state information for the online game being played by the user. In particular embodiments, the system may generate the usage analytics for the particular user by accessing statistical data attributed to this user, such as a set of options which the user frequently opts into, and/or a set of options which the user rarely (or never) opts into.

Next, at operation 606, the system may select a set of opt-in options to include in an opt-in request for the user based on the usage analytics. For example, the usage analytics may include a statistical distribution for a set of available options based on the statistical data (e.g., a categorical distribution for opt-in options based on a number of opted-in users for each option, or based on an opt-in frequency for each option), and the system may select the top K opt-in options in the statistical distribution.

The system may then send an opt-in request to the user at operation 608, such that the opt-in request includes the set of opt-in options selected for the user. Then, the system may receive an opt-in indication from the user at operation 610, such that the opt-in indication identifies the user and indicates a set of opt-in options that are selected by the user. The system may then record the set of opt-in options that are selected by the user at operation 612. For example, the system may record the set of opt-in options selected by the user in a database, and may record additional information for an opt-in option that the user selected. In various embodiments, the additional information may include a time and/or date at which the user opted into an option, a reference to the user's profile, and attributes and/or state information for the game being played by the user. The system may also contribute this additional information to the statistical data associated with the opt-in options that are selected (or not selected) by the user.

User Interface Displays

Figure 7A:
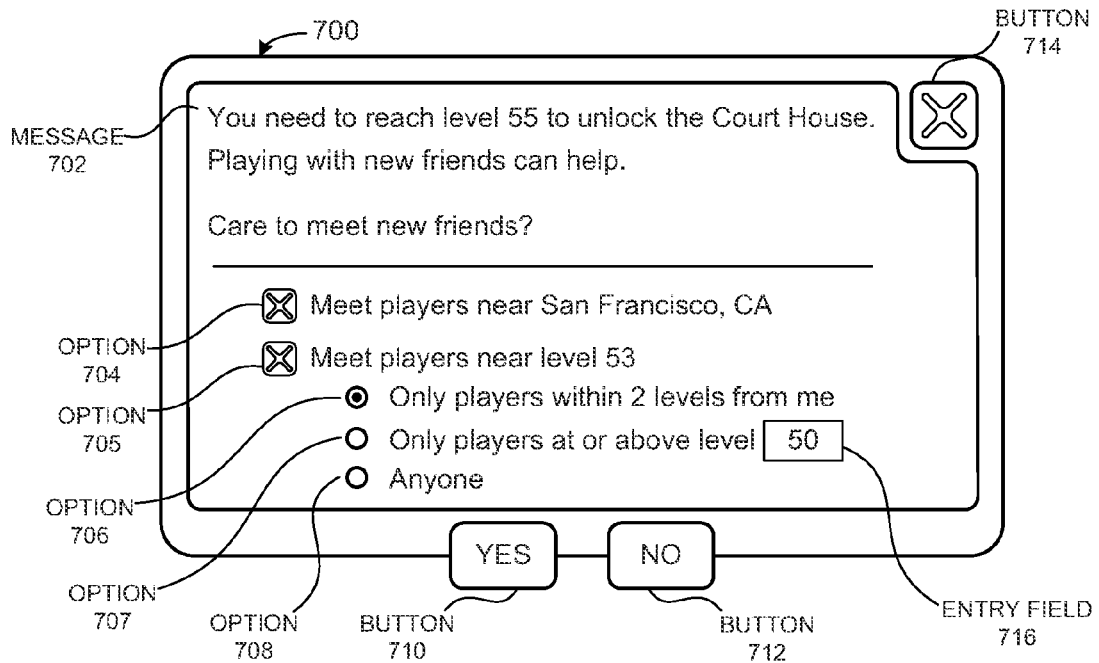
FIG. 7A illustrates an example of a display for an opt-in request presented to a user of the computer-implemented online game.

FIG. 7A illustrates an example of a display for an opt-in request being presented to a user of the computer-implemented online game. In particular embodiments, an opt-in display 700 may include a message 702, a set of opt-in options 704-708, and a set of buttons 710, 712, and 714. Message 702 may indicate the nature of a challenge which a user has not completed, and may ask the user whether the user desires to meet other players to achieve this challenge. The set of opt-in options may be presented to the user below message 702, and an opt-in option includes at least one graphical user interface (GUI) element. For example, an opt-in option may include a message that indicates the effect of selecting the option, and may include at least one GUI element that allows the user to easily indicate a desired value for the option.

In various embodiments, a GUI element may be a check box that allows a user to select or deselect an option, a radio button that allows the user to select one of a subset of options, or an entry field that allows the user to specify a value for the option. In particular embodiments, an opt-in option may include multiple GUI elements. For example, option 706 includes a radio-button that allows a user to select option 706 from the subset of options 706-708, and also includes an entry field 716 which allows a user to specify a minimum game level for a player that can be introduced to the user.

In various embodiments, the set of opt-in options may include one or more of: an option to meet players with a geographic location in proximity to the user (e.g., option 704), an option to meet players at a game level in proximity to the user (e.g., options 705-708), and an option to meet players whose profile data matches that of the user in some way (not shown).

In particular embodiments, the set of opt-in options may have a hierarchical relationship, where a subset of the opt-in options are made accessible to the user when the user selects a parent opt-in option to this subset of options. For example, option 705 may be a parent to options 706-708, such that the system may make options 706-708 accessible to the user when the user selects option 705, and the system may dim options 706-708 when the user deselects (or does not select) option 705. This subset of the opt-in options allows a user to further refine how the user is matched to other players of the online game. For example, option 706 allows the user (who may be at level 53) to indicate to the system that the user desires to meet other players that are at most two game levels away from the user (i.e., between levels 51 and 55). Moreover, option 707 allows the user to indicate a minimum game level that the system should use when selecting other players to introduce to the user, and option 708 allows the user to indicate to the system that the system can select a player that is at any game level.

The set of buttons presented with opt-in display 700 allow the user to accept, reject, or dismiss an opt-in request. For example, button 710 may allow the user to accept the opt-in request to the introduction mechanic, and to accept the opt-in options that the user has selected. Moreover, button 712 may allow the user to reject the opt-in request for a particular game objective (e.g., unlocking the Court House item), which may cause the system to not present the user with a later opt-in display that is associated with this game objective. Button 714 may allow the user to dismiss the opt-in request associated with the game objective without rejecting the opt-in request, which may allow the system to present an opt-in display to this opt-in request at a later date (e.g., the next time the user clicks on the Court House item).

Figure 7B:
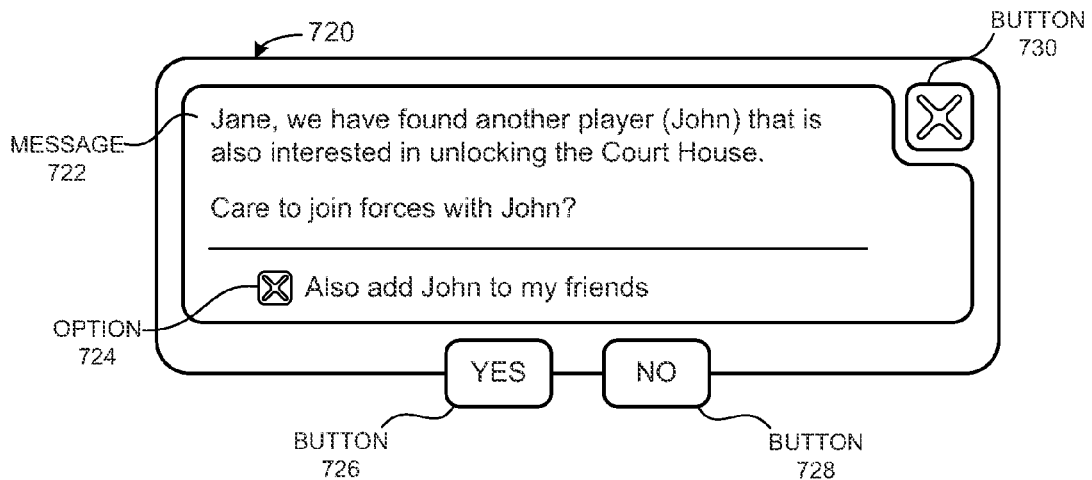
FIG. 7B illustrates an example of a display for an introduction request presented to a user of the computer-implemented online game.

FIG. 7B illustrates an example of a display for an introduction request presented to a user of the computer-implemented online game. In particular embodiments, an introduction display 720 may include a message 722, and a set of buttons 726, 728, and 730. Message 722 may indicate a name (e.g., a first name, or a screen name) for the player being introduced to the user, may indicate a description for a common challenge between the user and the other player, and may ask the user whether the user desires to interact with the other player.

Introduction display 720 may also include a set of options (e.g., option 724) that may be presented to the user below message 722. For example, option 724 includes a message that asks the user whether the user desires the system to add the other player to the user's set of friends, and includes a check box that allows the user to select or deselect this option. Thus, if the user selects or deselects the check box for option 724 and accepts the introduction request, the user indicates to the system whether the user desires to add the other player to the user's set of friends. In various embodiments, the user's set of friends may include first degree friends as identified by player relationship data within the online game, and/or by user relationship data associated with a third-party online social network.

The set of buttons presented with introduction display 720 allow the user to accept, reject, or dismiss an introduction request. For example, button 726 may allow the user to accept the introduction request for interacting with the other player, and to accept the options which the user has selected. Moreover, button 728 may allow the user to reject the introduction request for a particular player (e.g., John), which may cause the system to not present the user with a later introduction display that is associated with this player. Button 730 may allow the user to dismiss the introduction request associated with this player without rejecting the introduction request, which may allow the system to present an introduction display associated with this player at a later date.

Figure 7C:
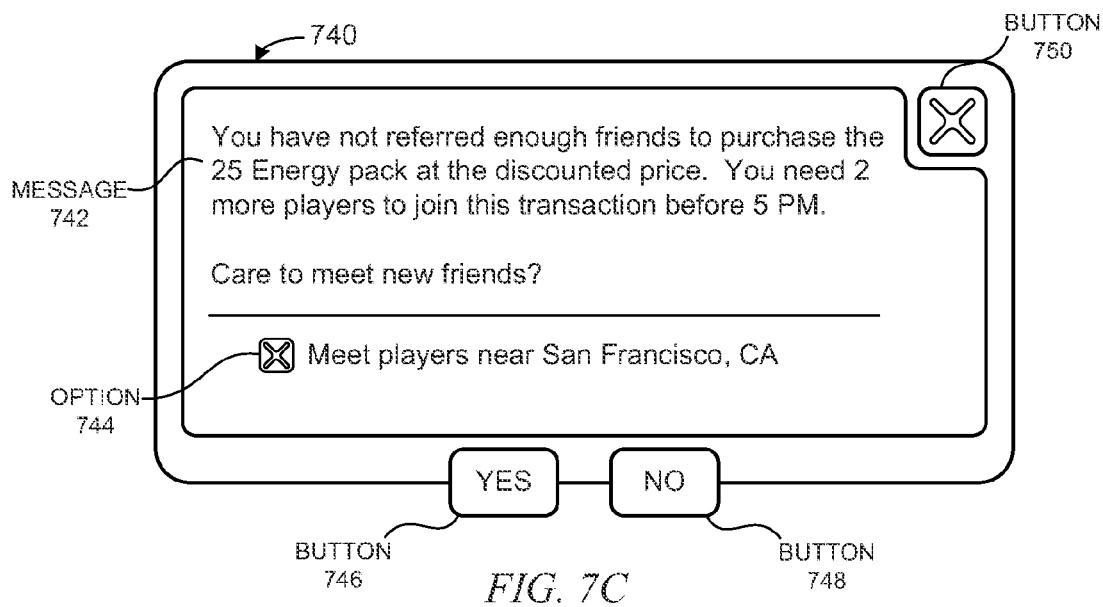
FIG. 7C illustrates an example of a display for an opt-in request associated with a flash-sale transaction within the computer-implemented online game.

FIG. 7C illustrates an example of a display for an opt-in request associated with a flash-sale transaction within the computer-implemented online game. In particular embodiments, an opt-in display 740 may include a message 742, a set of opt-in options (e.g., option 744), and a set of buttons 746, 748, and 750. Message 742 may indicate the nature of a flash sale transaction that is about to expire. For example, message 742 may indicate the sale item associated with the flash sale transaction, a price for the sale item, a determinable minimum number of additional users that complete the flash sale transaction, and/or a deadline for the flash sale transaction (or an amount of time remaining before the flash sale transaction expires). Message 742 may also ask the user whether the user desires to meet other players to complete the flash sale transaction.

The set of opt-in options (e.g., option 744) may be presented to the user below message 742, which allow a user to indicate to the introduction mechanic a set of characteristics to use when selecting a player to introduce to the user. In various embodiments, the system selects the set of opt-in options based on usage analytics for the introduction mechanic. As an example but not by way of limitation, the system may generate opt-in display 740 with option 744 based on a determination that users typically desire to meet other players in geographic proximity to themselves when they opt into the introduction mechanic for a flash sale transaction. Moreover, the system may generate opt-in display 740 without other options e.g., without options 705-708 of FIG. 7A) based on a determination that users typically do not select these options when they opt into the introduction mechanic for a flash sale transaction.

The set of buttons presented with opt-in display 740 allow the user to accept, reject, or dismiss an opt-in request. For example, button 746 may allow the user to accept the opt-in request to the introduction mechanic for a flash sale transaction, and to accept any opt-in options that the user may have selected. Moreover, button 748 may allow the user to reject the opt-in request for the flash sale transaction, which may cause the system to not present the user with a later opt-in display that is associated with a flash sale transaction for a particular item. Button 750 may allow the user to dismiss the opt-in request associated with the flash sale transaction without rejecting the opt-in request, which may allow the system to present an opt-in display to this opt-in request at a later date (e.g., when a determinable amount of time remains before the flash sale transaction expires).

Figure 8:
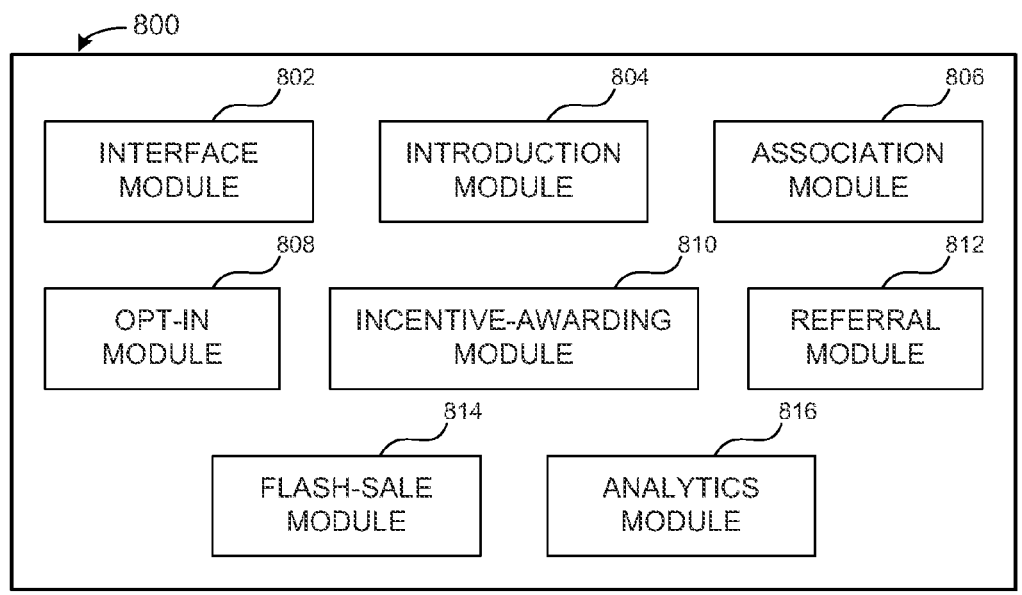
FIG. 8 illustrates an example apparatus in accordance with various example embodiments.

FIG. 8 illustrates an example apparatus in accordance with various example embodiments. Apparatus 800 may include an interface module 802, an introduction module 804, an association module 806, an opt-in module 808, an incentive-awarding module 810, a referral module 812, a flash-sale module 814, and an analytics module 816.

In particular embodiments, modules 802-816 may be implemented using one or more application-specific integrated circuit components, microprocessors, graphics processing units (GPUs), field-programmable gate arrays (FPGAs), or any combination thereof in other embodiments, apparatus 800 may include a server-side computing device and/or a client side computing device, and modules 802-816 may include executable code that is stored within a computer-readable storage medium of apparatus 800 and executed by a processing unit of apparatus 800.

Interface module 802 may generate graphical user interfaces and/or text-based user interfaces to interact with a user. For example, interface module 802 may generate an opt-in display that allows a user to select a set of options of an opt-in request, and allows the user to opt-in to introduction module 804. Also, interface module 802 may generate an introduction display that presents the user with an option to interact with another player of the computer-implemented game.

Introduction module 804 may introduce a user of a computer-implemented game to other players of the game that are experiencing a common game objective. Introduction module 804 may determine another player to introduce to the user based on the other player not being directly associated, as reflected within relationship data, with the user. Moreover, introduction module 804 may cause interface module 802 to present an introduction display to the user for the introduction request, and interface module 802 may generate an introduction confirmation for the user in response to the user pressing a confirmation button (e.g., a button labeled "YES") within the introduction display.

Association module 806 may associate the user and the other player with the common game objective of the computer-implemented game when the user and the other player are introduced to one another by the introduction module 804. By associating the user and the other player with the common game objective, association module 806 allows the user and the other player to interact to achieve the common game objective.

Opt-in module 808 may use interface module 802 to opt the user into introduction module 804. In particular embodiments, opt-in module 808 may send an opt-in request to the user, such that the opt-in request includes at least an option for the user to opt-in to the introduction module 804. Moreover, opt-in module 808 may receive an opt-in indication from the user, such that the opt-in indication indicates that the user is opting-in to the introduction module 804. For example, opt-in module 808 may cause interface module 802 to present an opt-in display for the opt-in request to the user, and interface module 802 may generate the opt-in indication in response to the user pressing a confirmation button (e.g., a button labeled "YES") within the opt-in display. Opt-in module 808 may also record the user as opted into the introduction module 804 based on the opt-in indication.

Referral module 812 may receive a referral message from a friend of the user, such that the referral message indicates that the friend is referring the user to opt-in to the introduction module 804. In particular embodiments, when referral module 812 receives the referral message, referral module 812 may cause opt-in module 808 to send an opt-in request to the user.

Incentive-awarding module 810 may cause opt-in module 808 to offer an incentive with an opt-in request for a user, thus encouraging the user to make more use of introduction module 804 during game play. Moreover, incentive-awarding module 810 may award the incentive to the user and the user's friend in response to determining that opt-in module 808 received the opt-in indication indicating at least that the user is opting into introduction module 804.

Flash-sale module 814 may present a flash sale transaction to the user in response to determining that the user has encountered an obstacle of the computer-implemented game. Recall that the flash sale transaction is complete when a determinable minimum number of users purchase an item prior to an expiration deadline of the flash sale transaction. Thus, if the user has not referred enough players to the flash-sale transaction, flash-sale module 814 may cause opt-in module 808 to generate an opt-in request for the user so that the user may meet other players that may be interested in the flash-sale transaction.

Analytics module 816 may generate usage analytics that indicate which opt-in options are favored by users of the computer-implemented game. In various embodiments, opt-in module 808 may use analytics module 816 to determine which opt-in options to include in an opt-in request based on the usage analytics, thereby causing interface module 802 to generate an opt-in display that is tailored to a particular user.

Game Systems, Social Networks, and Social Graphs

In an online multiplayer game, players control player characters (PCs), a game engine controls non-player characters (NPCs), and the game engine also manages player character state and tracks state for currently active (i.e., online) players and currently inactive (i.e., offline) players. A player character may have a set of attributes and a set of friends associated with the player character. As used herein, the terms "state" and "attributes" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a player (or a group of more than one players), the game engine may take into account the state of the player character (or group of PCs) that is playing, but also the state of one or more PCs of offline/inactive players who are connected to the current player (or PC, or group of PCs) through the game social graph but are not necessarily involved in the game at the time.

For example, Player A with six friends on his team (e.g., the friends that are listed as being in the player's mob/gang/set/army/business/crew/etc. depending on the nature of the game) may be playing the online game and choose to confront Player B who has 20 friends on her team, in some embodiments, a player may only have first-degree friends on his or her team. In other embodiments, a player may also have second-degree and higher degree friends on his or her team. To resolve the game event, in some embodiments the game engine may total up the weapon strength of the seven members of Player A's team and the weapon strength of the 21 members of Player B's team and decide an outcome of the confrontation based on a random variable applied to a probability distribution that favors the side with the greater total. In some embodiments, all of this may be done without any other current active participants other than Player A (i.e., Player A's friends, Player, B, and Player B's friends could all be offline or inactive). In some embodiments, the friends in a player's team may see a change in their state as part of the outcome of the game event. In some embodiments, the state (assets, condition, level) of friends beyond the first degree are taken into account.

Game Networking Systems

An online game may be hosted by game networking system 108*b*, which can be accessed using any suitable connection 110 with a suitable client device 104. A player may have a game account on game networking system 108*b*, wherein the game account may contain a variety of information associated with the player (e.g., the player's personal information, financial information, purchase history, player character state, game state, etc.). In some embodiments, a player may play multiple games on game networking system 108*b*, which may maintain a single game account for the player with respect to the multiple games, or multiple individual game accounts for each game with respect to the player. In some embodiments, game networking system 108*b* may assign a unique identifier to a player 102 of an online game hosted on game networking system 108*b*. Game networking system 108*b* may determine that a player 102 is accessing the online game by reading the user's cookies, which may be appended to HTTP requests transmitted by client device 104, and/or by the player 102 logging onto the online game.

In some embodiments, player 102 may access an online game and control the game's progress via client device 104 (e.g., by inputting commands to the game at the client device). Client device 104 can display the game interface, receive inputs from player 102, transmit user inputs or other events to the game engine, and receive instructions from the game engine. The game engine can be executed on any suitable system (such as, for example, client device 104, social networking system 108*a*, or game networking system 108*b*). For example, client device 104 may download client components of an online game, which are executed locally, while a remote game server, such as game networking system 108*b*, provides backend support for the client components and may be responsible for maintaining application data of the game, processing the inputs from the player, updating and/or synchronizing the game state based on the game logic and each input from the player, and transmitting instructions to client device 104. As another example, when player 102 provides an input to the game through the client device 104 (such as, for example, by typing on the keyboard or clicking the mouse of client device 104), the client components of the game may transmit the player's input to game networking system 108*b*.

In some embodiments, player 102 may access particular game instances of an online game. A game instance is a copy of a specific game play area that is created during runtime. In some embodiments, a game instance is a discrete game play area where one or more players 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific players. A game instance is associated with a specific player when one or more game parameters of the game instance are associated with the specific player. For example, a game instance associated with a first player may be named "First Player's Play Area." This game instance may be populated with the first player's PC and one or more in-game objects associated with the first player.

In some embodiments, a game instance associated with a specific player may only be accessible by that specific player.

For example, a first player may access a first game instance when playing an online game, and this first game instance may be inaccessible to all other players. In other embodiments, a game instance associated with a specific player may be accessible by one or more other players, either synchronously or asynchronously with the specific player's game play. For example, a first player may be associated with a first game instance, but the first game instance may be accessed by all first-degree friends in the first player's social network.

In some embodiments, the set of in-game actions available to a specific player may be different in a game instance that is associated with this player compared to a game instance that is not associated with this player. The set of in-game actions available to a specific player in a game instance associated with this player may be a subset, superset, or independent of the set of in-game actions available to this player in a game instance that is not associated with him. For example, a first player may be associated with Blackacre Farm in an online farming game, and may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In some embodiments, a game engine may interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a player or player character in an online multiplayer game.

In some embodiments, the social graph is managed by game networking system 108b, which is managed by the game operator. In other embodiments, the social graph is part of a social networking system 108a managed by a third-party (e.g., Facebook, Friendster, Myspace). In yet other embodiments, player 102 has a social network on both game networking system 108b and social networking system 108a, wherein player 102 can have a social network on the game networking system 108b that is a subset, superset, or independent of the player's social network on social networking system 108a. In such combined systems, game network system 108b can maintain social graph information with edge type attributes that indicate whether a given friend is an "in-game friend," an "out-of-game friend," or both. The various embodiments disclosed herein are operable when the social graph is managed by social networking system 108a, game networking system 108b, or both.

Systems and Methods

Figure 9:
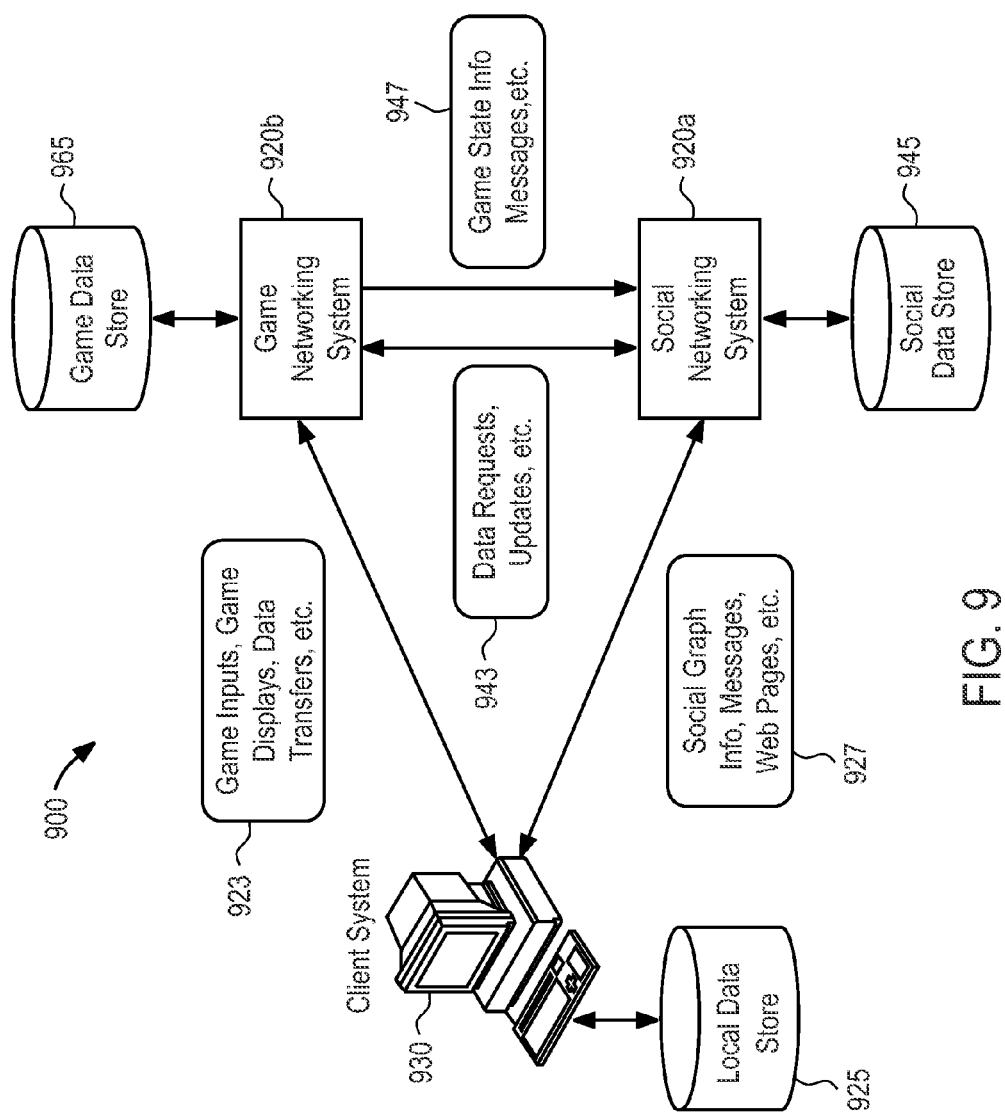
FIG. 9 illustrates an example data flow between the components of a system.

FIG. 9 illustrates an example data flow between the components of system 900. In some embodiments, system 900 can include client system 930, social networking system 920a, and game networking system 920b. The components of system 900 can be connected to each other in any suitable configuration, using any suitable type of connection. The components may be connected directly or over any suitable network. Client system 930, social networking system 920a, and game networking system 920b may have one or more corresponding data stores such as local data store 925, social data store 945, and game data store 965, respectively.

Social networking system 920a and game networking system 920b may also have at least one server that may communicate with client system 930 over an appropriate network. Social networking system 920a and game networking system 920b may have, for example, one or more internet servers for communicating with client system 930 via the Internet. Similarly, social networking system 920a and game networking system 920b may have one or more mobile servers for communicating with client system 930 via a mobile network (e.g., GSM, PCS, Wi-Fi, WPAN, etc.). In some embodiments, one server may be able to communicate with client system 930 over both the Internet and a mobile network. In other embodiments, separate servers can be used.

Client system 930 may receive and transmit data 923 to and from game networking system 920b. This data can include, for example, a web page, a message, a game input, a game display, a HTTP packet, a data request, transaction information, and other suitable data. At some other time, or at the same time, game networking system 920b may communicate data 943, 947 (e.g., game state information, game system account information, page info, messages, data requests, updates, etc.) with other networking systems, such as social networking system 920a (e.g., Facebook, Myspace, etc.). Client system 930 can also receive and transmit data 927 to and from social networking system 920a. This data can include, for example, web pages, messages, social graph information, social network displays, HTTP packets, data requests, transaction information, updates, and other suitable data.

Communication between client system 930, social networking system 920a, and game networking system 920b can occur over any appropriate electronic communication medium or network using any suitable communications protocols. For example, client system 930, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TENET, and a number of other protocols, may be used. In addition, a server in one interaction context may be a client in another interaction context. In some embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In some embodiments, a client request may cause a server to respond with a first data object, such as an HTML page, which itself refers to other data objects. A client application, such as a browser, will request these additional data objects as it parses or otherwise processes the first data object.

In some embodiments, an instance of an online game can be stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a player accesses an online game on game networking system 920b, the BLOB containing the game state for the instance corresponding to the player may be transmitted to client system 930 for use by a client-side executed object to process. In some embodiments, the client-side executable may be a FLASH-based game, which can de-serialize the game state data in the BLOB. As a player plays the game, the game logic implemented at client system 930 maintains and modifies the various game state parameters locally. The client-side game logic may also batch game events, such as mouse clicks, and transmit these events to game networking system 920b. Game networking system 920b may itself operate by retrieving a copy of the BLOB from a database or an intermediate memory cache (memcache) layer. Game networking system 920b can also de-serialize the BLOB to resolve the game state parameters and execute its own game logic based on the events in the batch file of events transmitted by the client to synchronize the game state on the server side. Game networking system 920b may then re-serialize the game state, now modified into a BLOB, and pass this to a memory cache layer for lazy updates to a persistent database.

In some embodiments, a computed-implemented game may be a text-based or turn-based game implemented as a series of web pages that are generated after a player selects one or more actions to perform. The web pages may be displayed in a browser client executed on client system 930. For example, a client application downloaded to client system 930 may operate to serve a set of web pages to a player. As another example, a computer-implemented game may be an animated or rendered game executable as a stand-alone application or within the context of a webpage or other structured document. In some embodiments, the computer-implemented game may be implemented using Adobe Flash-based technologies. As an example, a game may be fully or partially implemented as a SWF object that is embedded in a web page and executable by a Flash media player plug-in. In some embodiments, one or more described web pages may be associated with or accessed by social networking system 920a. This disclosure contemplates using any suitable application for the retrieval and rendering of structured documents hosted by any suitable network-addressable resource or website.

Application event data of a game is any data relevant to the game (e.g., player inputs). In some embodiments, each application datum may have a name and a value, and the value of the application datum may change (i.e., be updated) at any time. When an update to an application datum occurs at client system 930, either caused by an action of a game player or by the game logic itself, client system 930 may need to inform game networking system 920b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In some embodiments, client system 930 may include a Flash client. The Flash client may be configured to receive and run Flash application or game object code from any suitable networking system (such as, for example, social networking system 920a or game networking system 920b). In some embodiments, the Flash client may be run in a browser client executed on client system 930. A player can interact with Flash objects using client system 930 and the Flash client. The Flash objects can represent a variety of in-game objects. Thus, the player may perform various in-game actions on various in-game objects by making various changes and updates to the associated Flash objects.

In some embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In some embodiments, when the player makes a change to a Flash object representing an in-game object, the client-executed game logic may update one or more game state parameters associated with the in-game object. To ensure synchronization between the Flash object shown to the player at client system 930, the Flash client may send the events that caused the game state changes to the in-game object to game networking system 920b. However, to expedite the processing and hence the speed of the overall gaming experience, the Flash client may collect a batch of some number of events or updates into a batch file. The number of events or updates may be determined by the Flash client dynamically or determined by game networking system 920b based on server loads or other factors. For example, client system 930 may send a batch file to game networking system 920b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In some embodiments, each application datum may have a name and a value. The value of an application datum may change at any time in response to the game play of a player or in response to the game engine (e.g., based on the game logic). In some embodiments, an application data update occurs when the value of a specific application datum is changed.

In some embodiments, when a player plays an online game on client system 930, game networking system 920b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In some embodiments, while a player is not playing the online game, the corresponding BLOB may be stored in the database. This enables a player to stop playing the game at any time without losing the current state of the game the player is in. When a player resumes playing the game next time, game networking system 920b may retrieve the corresponding BLOB from the database to determine the most-recent values of the game-related data. In some embodiments, while a player is playing the online game, game networking system 920b may also load the corresponding BLOB into a memory cache so that the game system may have faster access to the BLOB and the game-related data contained therein.

Figure 10:
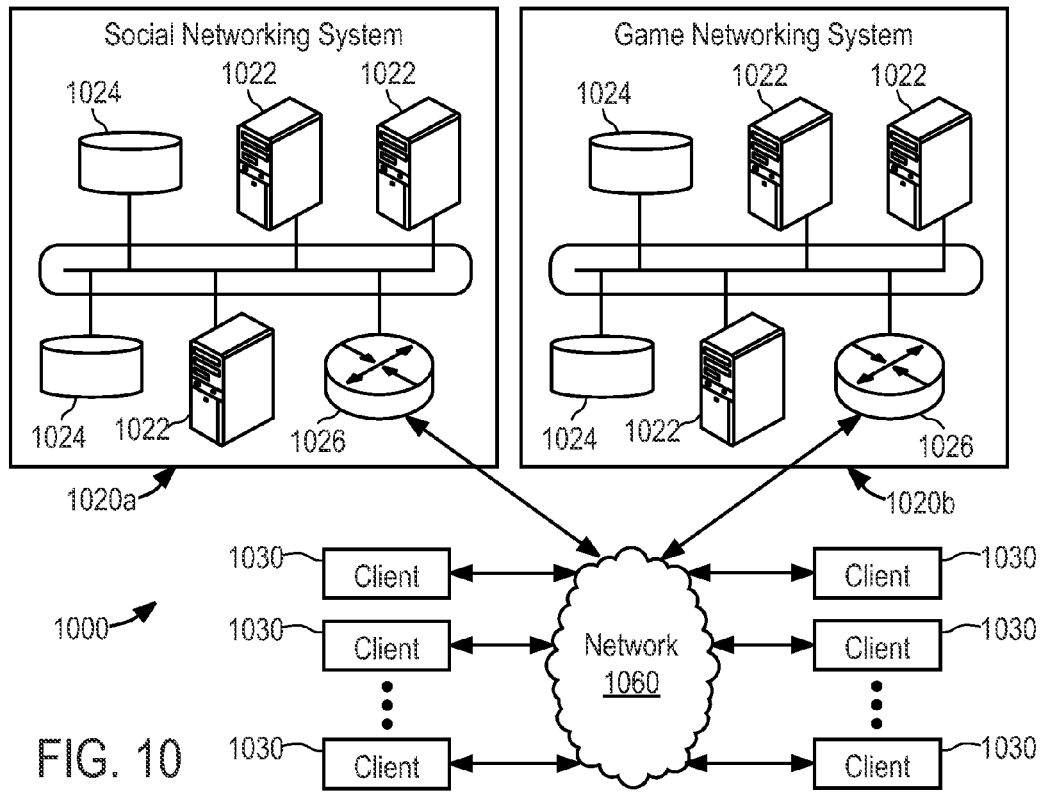
FIG. 10 illustrates an example network environment, in which various example embodiments may operate.

Various embodiments may operate in a wide area network environment, such as the Internet, including multiple network addressable systems. FIG. 10 illustrates an example network environment 1000, in which various example embodiments may operate. Network cloud 1060 generally represents one or more interconnected networks, over which the systems and hosts described herein can communicate. Network cloud 1060 may include packet-based wide area networks (such as the Internet), private networks, wireless networks, satellite networks, cellular networks, paging networks, and the like. As FIG. 10 illustrates, various embodiments may operate in a network environment 1000 comprising one or more networking systems, such as social networking system 1020a, game networking system 1020, and one or more client systems 1030. The components of social networking system 1020a and game networking system 1020b operate analogously; as such, hereinafter they may be referred to simply as networking system 1020. Client systems 1030 are operably connected to the network environment 1000 via a network service provider, a wireless carrier, or any other suitable means.

Networking system 1020 is a network addressable system that, in various example embodiments, comprises one or more physical servers 1022 and data stores 1024. The one or more physical servers 1022 are operably connected to computer network cloud 1060 via, by way of example, a set of routers and/or networking switches 1026. In an example embodiment, the functionality hosted by the one or more physical servers 1022 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

Physical servers 1022 may host functionality directed to the operations of networking system 1020. Hereinafter servers 1022 may be referred to as server 1022, although server 1022 may include numerous servers hosting, for example, networking system 1020, as well as other content distribution servers, data stores, and databases. Data store 1024 may store content and data relating to, and enabling, operation of networking system 1020 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc.

Logically, data store 1024 corresponds to one or more of a variety of separate and integrated databases, such as relational databases and object-oriented databases, that maintain information as an integrated collection of logically related records or files stored on one or more physical systems. Structurally, data store 1024 may generally include one or more of a large class of data storage and management systems. In some embodiments, data store 1024 may be implemented by any suitable physical system(s) including components, such as one or more database servers, mass storage media, media library systems, storage area networks, data storage clouds, and the like. In one example embodiment, data store 1024 includes one or more servers, databases (e.g., MySQL), and/or data warehouses. Data store 1024 may include data associated with different networking system 1020 users and/or client systems 1030.

Client system 1030 is generally a computer or computing device including functionality for communicating (e.g., remotely) over a computer network, Client system 1030 may be a desktop computer, laptop computer, personal digital assistant (PDA), in- or out-of-car navigation system, smart phone or other cellular or mobile phone, or mobile gaming device, among other suitable computing devices. Client system 1030 may execute one or more client applications, such as a Web browser.

When a user at a client system 1030 desires to view a particular webpage (hereinafter also referred to as target structured document) hosted by networking system 1020, the user's web browser, or other document rendering engine or suitable client application, formulates and transmits a request to networking system 1020. The request generally includes a URL or other document identifier as well as metadata or other information. By way of example, the request may include information identifying the user, a timestamp identifying when the request was transmitted, and/or location information identifying a geographic location of the user's client system 1030 or a logical network location of the user's client system 1030.

Although the example network environment 1000 described above and illustrated in FIG. 10 is described with respect to social networking system 1020a and game networking system 1020b, this disclosure encompasses any suitable network environment using any suitable systems. For example, the network environment may include online media systems, online reviewing systems, online search engines, online advertising systems, or any combination of two or more such systems.

Figure 11:
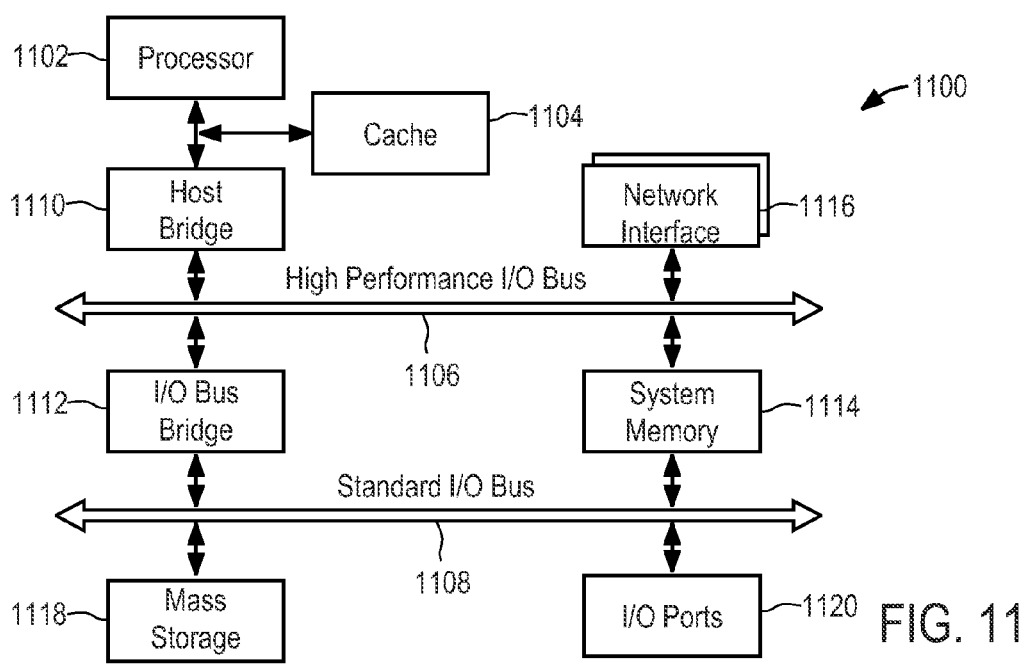
FIG. 11 illustrates an example computing system architecture, which may be used to implement a server or a client system.

FIG. 11 illustrates an example computing system architecture, which may be used to implement a server 1022 or a client system 1030. In one embodiment, hardware system 1100 comprises a processor 1102, a cache memory 1104, and one or more executable modules and drivers, stored on a tangible computer readable medium, directed to the functions described herein. Additionally, hardware system 1100 may include a high performance input/output (I/O) bus 1106 and a standard I/O bus 1108. A host bridge 1110 may couple processor 1102 to high performance I/O bus 1106, whereas I/O bus bridge 1112 couples the two buses 1106 and 1108 to each other. A system memory 1114 and one or more network/communication interfaces 1116 may couple to bus 1106. Hardware system 1100 may further include video memory (not shown) and a display device coupled to the video memory. Mass storage 1118 and I/O ports 1120 may couple to bus 1108. Hardware system 1100 may optionally include a keyboard, a pointing device, and a display device (not shown) coupled to bus 1108. Collectively, these elements are intended to represent a broad category of computer hardware systems.

The elements of hardware system 1100 are described in greater detail below. In particular, network interface 1116 provides communication between hardware system 1100 and any of a wide range of networks, such as an Ethernet (e.g., IEEE 802.3) network, a backplane, etc. Mass storage 1118 provides permanent storage for the data and programming instructions to perform the above-described functions implemented in servers 1022 of FIG. 10, whereas system memory 1114 (e.g., DRAM) provides temporary storage for the data and programming instructions when executed by processor 1102. I/O ports 1120 are one or more serial and/or parallel communication ports that provide communication between additional peripheral devices, which may be coupled to hardware system 1100.

Hardware system 1100 may include a variety of system architectures and various components of hardware system 1100 may be rearranged. For example, cache memory 1104 may be on-chip with processor 1102. Alternatively, cache memory 1104 and processor 1102 may be packed together as a "processor module," with processor 1102 being referred to as the "processor core." Furthermore, certain embodiments of the present disclosure may neither require nor include all of the above components. For example, the peripheral devices shown coupled to standard I/O bus 1108 may couple to high performance I/O bus 1106. In addition, in some embodiments, only a single bus may exist, with the components of hardware system 1100 being coupled to the single bus. Furthermore, hardware system 1100 may include additional components, such as additional processors, storage devices, or memories.

An operating system manages and controls the operation of hardware system 1100, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media, Miscellaneous One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal UPS, personal digital assistance, personal gaming device, etc.), that makes API calls directly to a server. Still further, while the embodiments described above operate with business-related virtual objects (such as stores and restaurants), embodiments of the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method to introduce a first user of a computer-implemented game to other users, the method comprising:
    ranking a plurality of users based on a suitability for interacting on achieving a common game objective with the first user;
    determining a second user of the ranked plurality of users to introduce to the first user based on the second user not being directly associated, as reflected within relationship data, with the first user; and
    using at least one processor, based on the first and second users being opted into an introduction mechanic of the computer-implemented game, associating the first user and the second user with the common game objective of the computer-implemented game in response to the first player encountering the common game objective after a start of game play, thereby allowing the first user and the second user to interact to achieve the common game objective.

2. The method of claim 1, wherein the determining of the second user to introduce to the first user involves:
    ranking a plurality of users of the computer-implemented game according to degree of separation, as reflected within the relationship data, from the first user; and
    determining the second user based on the ranking of the plurality of users.

3. The method of claim 1, wherein the ranking involves:
    ranking a plurality of users of the computer-implemented game according to game level proximity to the first user.

4. The method of claim 3, wherein the second user is at most three game levels apart from the first user.

5. The method of claim 1, further comprising sending an opt-in request to the first user, wherein the opt-in request includes at least an option for the first user to opt-in to the introduction mechanic;
    receiving an opt-in indication from the first user of a computer-implemented game, wherein the opt-in indication indicates that the first user is opting-in to the introduction mechanic of the computer-implemented game; and
    recording the first user as opted into the introduction mechanism based on the opt-in indication.

6. The method of claim 5, wherein the opt-in request further includes an option for the first user to opt-in to geographic-proximity introductions by the introduction mechanic.

7. The method of claim 6, wherein the opt-in indication further indicates that the first user is opting-in to geographic-proximity introductions; and wherein the determining of the second user to introduce to the first user involves identifying a set of users associated with a first geographic location that is within a determinable distance from a second geographic location associated with the first user.

8. The method of claim 5, wherein the opt-in request is sent to the first user in response to determining that the first user has not achieved the game objective.

9. The method of claim 5, wherein the opt-in request is sent to the first user in response to detecting a decrease in game interactions from the first user.

10. The method of claim 5, wherein the opt-in request is sent to the first user in response to the determining of the second user, and determining that the first user is not opted into the introduction mechanic.

11. The method of claim 5, further comprising receiving a referral message from a third user associated with the first user, wherein the referral message indicates that the third user is referring the first user to opt-in to the introduction mechanic, and wherein the opt-in request is sent to the first user in response to receiving the referral message.

12. The method of claim 11, wherein the opt-in request includes an incentive for the first user; and
wherein the method further comprises awarding the incentive to the first user and the third user in response to receiving the opt-in indication indicating at least that the first user is opting-in to the introduction mechanic.

13. The method of claim 1, further comprising:
based on the determining of the second user, sending an introduction request to the first user, wherein the introduction request identifies the second user; and
associating the first user and the second user in the relationship data based on receiving a first introduction confirmation from the first user and a second confirmation introduction from the second user.

14. The method of claim 13, wherein the introduction request identifies the common game objective.

15. The method of claim 13, wherein the introduction request includes an incentive for the first user; and
wherein the method further comprises awarding the incentive to the first user in response to receiving the first and second introduction confirmations.

16. The method of claim 1, wherein the common game objective includes at least one of:
a new game challenge which the first user has not initiated;
a current game challenge which the first user has not completed;
a game level which the first user has not reached; and
a virtual good which the first user has not obtained.

17. The method of claim 1, wherein the common game objective includes a competitive challenge of the computer-implemented game; and
wherein interactions between the first user and the second user include the first user and the second user competing to achieve the common game objective.

18. The method of claim 17, wherein a losing participant in the competitive challenge receives a diminished reward relative to a reward awarded to a winning participant in the competitive challenge.

19. The method of claim 1, wherein the common game objective includes a cooperative challenge of the computer-implemented game; and
wherein interactions between the first user and the second user include the first user and the second user cooperating to achieve the common game objective.

20. The method of claim 19, wherein the cooperating involves the first user and the second user participating in a synchronous interaction.

21. The method of claim 19, wherein the cooperative challenge is a timed challenge.

22. The method of claim 5, wherein the common game objective includes a flash sale transaction;
wherein the flash sale transaction is complete when a determinable minimum number of users purchase an item prior to an expiration deadline of the flash sale transaction; and
wherein the opt-in indication identifying the first user further indicates that the first user desires to meet other users of the computer-implemented game to complete the flash sale transaction.

23. The method of claim 22, further comprising presenting the flash sale transaction to the first user in response to determining that the first user has encountered an obstacle of the computer-implemented game.

24. The method of claim 5, further comprising:
generating usage analytics based on opt-in indications received from a set of users of the computer-implemented game;
wherein sending the opt-in request to the first user involves determining a set of opt-in options to include in the opt-in request based on the usage analytics.

25. An apparatus comprising:
a ranking module for ranking a plurality of users based on a suitability for interacting on achieving a common game objective with the first user;
an introduction module to introduce a first user of the computer-implemented game to other users, wherein the introduction module determines a second user of the ranked plurality of users to introduce to the first user based on the second user not being directly associated, as reflected within relationship data, with the first user; and
an association module to associate the first user and the second user with the common game objective of the computer-implemented game in response to the first player encountering the common game objective after a start of game play, based on the first and second users being opted into the introduction module, thereby allowing the first user and the second user to interact to achieve the common game objective.

26. The apparatus of claim 25, wherein the determining of the second user to introduce to the first user involves:
ranking a plurality of users of the computer-implemented game according to degree of separation, as reflected within the relationship data, from the first user; and
determining the second user based on the ranking of the plurality of users.

27. The apparatus of claim 25, wherein the ranking involves:
ranking a plurality of users of the computer-implemented game according to game level proximity to the first user.

28. The apparatus of claim 25, further comprising an opt-in module to:
send an opt-in request to the first user, wherein the opt-in request includes at least an option for the first user to opt-in to the introduction module;
receive an opt-in indication from the first user of the computer-implemented game, wherein the opt-in indication indicates that the first user is opting-in to the introduction module; and
record the first user as opted into the introduction module based on the opt-in indication.

29. The apparatus of claim 28, wherein the opt-in module sends the opt-in request to the first user in response to determining that the first user has not achieved the common game objective.

30. The apparatus of claim 28, wherein the opt-in module sends the opt-in request to the first user in response to detecting a decrease in game interactions from the first user.

31. The apparatus of claim 28, wherein the opt-in module sends the opt-in request to the first user in response to the determining of the second user, and determining that the first user is not opted into the introduction module.

32. The apparatus of claim 28, further comprising a referral module to receive a referral message from a third user associated with the first user, wherein the referral message indicates that the third user is referring the first user to opt-in to the introduction module, and wherein the opt-in module sends the opt-in request to the first user in response to the referral module receiving the referral message.

33. The apparatus of claim 28, wherein the opt-in request includes an incentive for the first user; a
   wherein the apparatus further comprises an incentive-awarding module to award the incentive to the first user and the third user in response to determining that the opt-in module received the opt-in indication indicating at least that the first user is opting-in to the introduction module.

34. The apparatus of claim 33, wherein the introduction module sends an introduction request to the first user based on the determining of the second user, wherein the introduction request identifies the second user; and
   wherein the association-module associates the first user and the second user in the relationship data based on determining that the introduction module received a first introduction confirmation from the first user and a second introduction confirmation from the second user.

35. The apparatus of claim 34, wherein the introduction request includes an incentive for the first user; and
   wherein the incentive-awarding module awards the incentive to the first user in response to determining that the introduction module received the first and second introduction confirmations.

36. The apparatus of claim 33, wherein the common game objective includes a competitive challenge of the computer-implemented game;
   wherein interactions between the first user and the second user include the first user and the second user competing to achieve the common game objective; and
   wherein the incentive-awarding module awards, to a losing participant in the competitive challenge, a diminished reward relative to a reward awarded to a winning participant in the competitive challenge.

37. The apparatus of claim 25, wherein the common game objective includes a cooperative challenge of the computer-implemented game;
   wherein interactions between the first user and the second user include the first user and the second user cooperating to achieve the common game objective; and
   wherein the cooperating involves the first user and the second user participating in a synchronous interaction.

38. The apparatus of claim 28, wherein the common game objective includes a flash sale transaction;
   wherein the system further comprises a flash-sale module to present the flash sale transaction to the first user in response to determining that the first user has encountered an obstacle of the computer-implemented game;
   wherein the flash sale transaction is complete when a determinable minimum number of users purchase an item prior to an expiration deadline of the flash sale transaction; and
   wherein the opt-in indication identifying the first user further indicates that the first user desires to meet other users of the computer-implemented game to complete the flash sale transaction.

39. The apparatus of claim 28, further comprising an analytics module to generate usage analytics based on opt-in indications received from a set of users of the computer-implemented game;
   wherein prior to the opt-in module sending the opt-in request to the first user, the opt-in module determines a set of opt-in options to include in the opt-in request based on the usage analytics.

\* \* \* \* \*

UNITED STATES PATENT AND TRADEMARK OFFICE
CERTIFICATE OF CORRECTION

PATENT NO. : 8,771,079 B1  
APPLICATION NO. : 13/077690  
DATED : July 8, 2014  
INVENTOR(S) : Sethi et al.

It is certified that error appears in the above-identified patent and that said Letters Patent is hereby corrected as shown below:

On the Title Page

On page 2, in column 1, under "Other Publications", line 26, delete "5," and insert --24,--, therefor On page 2, in column 2, under "Other Publications", line 43, delete "Frequentiy" and insert --Frequently--, therefor In the Specification In column 3, line 3, delete "game," and insert --game.--, therefor In column 3, line 8, delete "embodiments," and insert --embodiments.--, therefor In column 4, line 42, before "friends", insert --(i.e.,--, therefor (second occurrence)

In column 10, line 15, delete "transaction, some" and insert --transaction. In some--, therefor In column 11, line 23, delete "identities" and insert --identifies--, therefor In column 13, line 30, before "e.g.,", insert --(--, therefor In column 13, line 59, delete "thereof in" and insert --thereof. In--, therefor In column 15, line 36, before "cross", insert --(e.g.,--, therefor In column 15, line 53, delete "team, in" and insert --team. In--, therefor In column 18, line 46, delete "TENET," and insert --TELNET,--, therefor Signed and Sealed this  
Eleventh Day of November, 2014

Michelle K. Lee  
*Deputy Director of the United States Patent and Trademark Office*

CERTIFICATE OF CORRECTION (continued)
U.S. Pat. No. 8,771,079 B1

In column 19, line 65, delete "video," and insert --video.--, therefor

In column 21, line 17, delete "1020," and insert --1020b,--, therefor

In column 21, line 45, after "of", insert --,--, therefor

In column 23, line 40, delete "media," and insert --media.--, therefor

In column 24, line 5, delete "UPS," and insert --GPS,--, therefor

In the Claims

In column 27, line 20, in Claim 33, delete "a" and insert --and--, therefor